US00RE40281E

(19) United States
(12) Reissued Patent
Tzannes et al.

(10) Patent Number: US RE40,281 E
(45) Date of Reissued Patent: Apr. 29, 2008

(54) SIGNAL PROCESSING UTILIZING A TREE-STRUCTURED ARRAY

(75) Inventors: Michael A. Tzannes, Lexington, MA (US); Peter N. Heller, Somerville, MA (US); John P. Stautner, The Woodlands, TX (US); William R. Morrell, Seattle, WA (US); Sriram Jayasimha, Hyderabad (IN)

(73) Assignee: Aware, Inc., Bedford, MA (US)

(21) Appl. No.: 10/994,925

(22) Filed: Nov. 23, 2004

(Under 37 CFR 1.47)

Related U.S. Patent Documents

Reissue of:

(64) Patent No.: 6,252,909
Issued: Jun. 26, 2001
Appl. No.: 08/804,909
Filed: Feb. 25, 1997

U.S. Applications:

(62) Division of application No. 10/603,833, filed on Jun. 26, 2003, which is a continuation-in-part of application No. 08/307,331, filed on Sep. 16, 1994, now Pat. No. 5,606,642, which is a division of application No. 07/948,147, filed on Sep. 21, 1992, now Pat. No. 5,408,580.

(51) Int. Cl.

| | |
|---|---|
| ***G10L 19/02*** | (2006.01) |
| ***H04K 1/10*** | (2006.01) |
| ***H04B 1/38*** | (2006.01) |
| ***H03D 1/24*** | (2006.01) |

(52) U.S. Cl. ..... 704/205; 375/260; 375/219; 329/357

(58) Field of Classification Search ..... None
See application file for complete search history.

(56) References Cited

U.S. PATENT DOCUMENTS 3,947,827 A * 3/1976 Dautremont et al. ..... 365/45

(Continued)

FOREIGN PATENT DOCUMENTS

EP 0400222 * 5/1990

OTHER PUBLICATIONS

Vaidyanathan, "Quadrature Mirror Filter Banks, M–Band Extensions and Perfect–Reconstruction Techniques," IEEE ASSP Magazine, Jul. 1987, pp. 4–20.*

(Continued)

*Primary Examiner*—David D. Knepper
(74) *Attorney, Agent, or Firm*—Sheridan Ross P.C.; Jason H. Vick

(57) ABSTRACT

[A communication system for sending a sequence of symbols on a communication link. The system includes a transmitter for placing information indicative of the sequence of symbols on the communication link and a receiver for receiving the information placed on the communication link by the transmitter. The transmitter includes a clock for defining successive frames, each of the frames including M time intervals, where M is an integer greater than 1. A modulator modulates each of M carrier signals with a signal related to the value of one of the symbols thereby generating a modulated carrier signal corresponding to each of the carrier signals. The modulated carriers are combined into a sum signal which is transmitted on the communication link. The carrier signals include first and second carriers, the first carrier having a different bandwidth than the second carrier. In one embodiment, the modulator includes a tree-structured array of filter banks having M leaf nodes, each of the values related to the symbols forming an input to a corresponding one of the leaf nodes. Each of the nodes includes one of the filter banks. Similarly, the receiver can be constructed of a tree-structured array of sub-band filter banks for converting M time-domain samples received on the communication link to M symbol values.] *Signal processing is performed by splitting a signal into subbands using a plurality of filter banks connected to form a tree-structured array. The filter banks are connected so that the signal is split into subbands of different size. The subbands can be designed to approximate the bands of the human auditory system for audio signal processing applications. Reconstruction of signals using a plurality of synthesis filter banks connected to form a tree-structured array is also performed.*

121 Claims, 16 Drawing Sheets

U.S. PATENT DOCUMENTS 4,216,354 A * 8/1980 Esteban et al. ..... 704/229
4,622,680 A * 11/1986 Zinser ..... 375/245
4,766,562 A * 8/1988 Vary ..... 708/313
4,799,179 A * 1/1989 Masson et al. ..... 708/313
4,815,023 A * 3/1989 Arbeiter ..... 708/301
4,829,378 A * 5/1989 LeGall ..... 375/240.11
4,852,179 A * 7/1989 Fette ..... 704/230
4,882,754 A * 11/1989 Weaver et al. ..... 704/201
4,896,362 A * 1/1990 Veldhuis et al. ..... 704/200.1
4,918,524 A * 4/1990 Ansari et al. ..... 375/240.11
4,949,383 A * 8/1990 Koh et al. ..... 704/229
4,972,484 A * 11/1990 Theile et al. ..... 704/200.1
5,048,054 A * 9/1991 Eyuboglu et al. ..... 375/222
5,144,569 A * 9/1992 Kunold ..... 708/300
5,170,413 A * 12/1992 Hess et al. ..... 375/260
5,243,629 A * 9/1993 Wei ..... 375/299
5,285,474 A * 2/1994 Chow et al. ..... 375/231
5,479,447 A * 12/1995 Chow et al. ..... 375/260
5,517,435 A * 5/1996 Sugiyama ..... 708/322

OTHER PUBLICATIONS

K. Brandenburg & J.D. Johnson, "Second Generation Perceptual Audio Coding: The Hybrid Coder", 1990.

K. Brandenburg & Gerhard Stoll, "The ISO/MPEG–Audio Coder: A Generic Standard For Coding of High Quality Digital Audio", 1992.

Brandenburg, Karlheinz and Johnston, J.D., AT&T Bell Laboratories, Second Generation Perceptual Audio Coding: The Hybrid Coder, Presented at the 88$^{th}$ Convention, Mar. 13–19, 1990, Montreux, AES, pp. 1–12, An Audio Engineering Society Preprint, Preprint 2937A.

* cited by examiner

SIGNAL PROCESSING UTILIZING A TREE-STRUCTURED ARRAY

Matter enclosed in heavy brackets [ ] appears in the original patent but forms no part of this reissue specification; matter printed in italics indicates the additions made by reissue.

[This application] *This application is a Division of U.S. Reissue application No. 10/603,833 filed Jun. 26, 2003, now abandoned, which is a Reissue of U.S. application No. 08/804,909, filed Feb. 25, 1997, now U.S. Pat. No. 6,252,909, issued Jun. 26, 2001. U.S. application No. 08/804,909, filed Feb. 25, 1997,* is a Continuation-in-Part of U.S. patent application Ser. No. 08/307,331, filed Sep. 16, 1994, Pat. No. 5,606,642, which is a division of U.S. Patent Application Ser. No. 07/948,147, filed Sep. 21, 1992, Pat. No. 5,408,580.

FIELD OF THE INVENTION

The present invention relates to data transmission systems, and more particularly, to an improved multi-carrier transmission system. *The present invention further relates to audio compression and decompression systems.*

BACKGROUND OF THE INVENTION

In prior art multi-carrier systems, a communication path having a fixed bandwidth is divided into a number of sub-bands having different frequencies. The width of the sub-bands is chosen to be the same for all sub-bands and small enough to allow the distortion in each sub-band to be modeled by a single attenuation and phase shift for the band. If the noise level in each band is known, the volume of data sent in each band may be maximized for any given bit error rate by choosing a symbol set for each channel having the maximum number of symbols consistent with the available signal-to-noise ratio of the channel. By using each sub-band at its maximum capacity, the amount of data that can be transmitted in the communication path for a given error rate is maximized.

For example, consider a system in which one of the sub-channels has a signal-to-noise ratio which allows at least 16 digital levels to be distinguished from one another with an acceptable error rate. In this case, a symbol set having 16 possible signal values is chosen. If the incoming data stream is binary, each consecutive group of 4 bits is used to compute the corresponding symbol value which is then sent on the communication channel in the sub-band in question.

In digitally implemented multi-channel systems, the actual synthesis of the signal representing the sum of the various modulated carriers is carried out via a mathematical transformation that generates a sequence of numbers that represents the amplitude of the signal as function of time. For example, a sum signal may be generated by applying an inverse Fourier transformation to a data vector generated from the symbols to be transmitted in the next time interval. Similarly, the symbols are recovered at the receiver using the corresponding inverse transformation.

The computational workload inherent in synthesizing and analyzing the multi-carrier signal is related to the number of sub-bands. For example, if Fourier transforms are utilized, the workload is of order NlogN where N is the number of sub-bands. Similar relationships exist for other transforms. Hence, it is advantageous to minimize the number of sub-bands.

There are two factors that determine the number of sub-bands in prior art systems. First, the prior art systems utilize a uniform bandwidth. Hence, the number of sub-bands is at least as great as the total bandwidth available for transmission divided by the bandwidth of the smallest sub-band. The size of the smallest sub-band is determined by need to characterize each channel by a single attenuation and phase shift. Thus, the sub-band having the most rapidly varying distortion sets the number of sub-bands and the computational workload in the case in which white noise is the primary contributor to the signal-to-noise ratio.

In systems in which the major source of interference is narrow band interference, the minimum sub-band is set with reference to the narrowest sub-band that must be removed from the communication channel to avoid the interference. Consider a communication channel consisting of a twisted pair of wires which is operated at a total communication band which overlaps with the AM broadcast band in frequency. Because of the imperfect shielding of the wires, interference from strong radio stations will be picked up by the twisted pair. Hence, the sub-bands that correspond to these radio signals are not usable. In this case, prior art systems break the communication band into a series of uniform sub-bands in which certain sub-bands are not used. Ideally, the sub-bands are sufficiently narrow that only the portion of the spectrum that is blocked by a radio signal is lost when a sub-band is marked as being unusable.

Broadly, it is the object of the present invention to provide an improved multi-carrier transmission system.

It is a further object of the present invention to provide a multi-carrier transmission system having a lower computational workload than imposed by systems having bands of equal band-width.

These and other objects of the present invention will become apparent to those skilled in the art from the following detailed description of the invention and the accompanying drawings.

*While digital audio recordings provide many advantages over analog systems, the data storage requirements for high-fidelity recordings are substantial. A high fidelity recording typically requires more than one million bits per second of playback time. The total storage needed for even a short recording is too high for many computer applications. In addition, the digital bit rates inherent in non-compressed high fidelity audio recordings makes the transmission of such audio tracks over limited bandwidth transmission systems difficult. Hence, systems for compressing audio sound tracks to reduce the storage and bandwidth requirements are in great demand.*

*One class of prior an audio compression systems divide the sound track into a series of segments. Over the time interval represented by each segment, the sound track is analyzed to determine the signal components in each of a plurality of frequency bands. The measured components are then replaced by approximations requiring fewer bits to represent, but which preserve features of the sound track that are important to a human listener. At the receiver, an approximation to the original sound track is generated by reversing the analysis process with the approximations in place of the original signal components.*

*The analysis and synthesis operations are normally carried out with the aid of perfect, or near perfect, reconstruction filter banks. The systems in question include an analysis filter bank which generates a set of decimated subband outputs from a segment of the sound track. Each decimated subband output represents the signal in a predetermined frequency range. The inverse operation is carried out by a synthesis filter bank which accepts a set of decimated*

*subband outputs and generates therefrom a segment of audio sound track. In practice, the synthesis and analysis filter banks are implemented on digital computers which may be general purpose computers or special computers designed to more efficiently carry out the operations. If the analysis and synthesis operations are carried out with sufficient precision, the segment of audio sound track generated by the synthesis filter bank will match the original segment of audio sound track that was inputted to the analysis filter bank. The differences between the reconstructed audio sound track and the original sound track can be made arbitrarily small. In this case, the specific filter bank characteristics such as the length of the segment analyzed, the number of filters in the filter bank, and the location and shape of filter response characteristics would be of little interest, since any set of filter banks satisfying the perfect, or near-perfect, reconstruction condition would exactly regenerate the audio segment.*

*Unfortunately, the replacement of the frequency components generated by the analysis filter band with a quantized approximation thereto results in artifacts that do depend on the detail characteristics of the filter banks. There is no single segment length for which the artifacts in the reconstructed audio track can be minimized. Hence, the length of the segments analyzed in prior art systems is chosen to be a compromise. When the frequency components are replaced by approximations, an error is introduced in each component. An error in a given frequency component produces an acoustical effect which is equivalent to the introduction of a noise signal with frequency characteristics that depend on filter characteristics of the corresponding filter in the filter bank. The noise signal will be present over the entire segment of the reconstructed sound track. Hence, the length of the segments is reflected in the types of artifacts introduced by the approximations. If the segment is short, the artifacts are less noticeable. Hence, short segments are preferred. However, if the segment is too short, there is insufficient spectral resolution to acquire information needed to properly determine the minimum number of bits needed to represent each frequency component. On the other hand, if the segment is too long, temporal resolution of the human auditory system will detect artifacts.*

*Prior art systems also utilize filter banks in which the frequency bands are uniform in size. Systems with a few (16-32) sub-bands in a 0-22 kHz frequency range are generally called "subband coders" while those with a large number of sub-bands (.gtoreq.64) are called "transform coders". It is known from psychophysical studies of the human auditory system that there are critical bandwidths which vary with frequency. The information in a critical band may be approximated by a component representing the time averaged signal amplitude in the critical band.*

*In addition, the ear's sensitivity to a noise source in the presence of a localized frequency component such as a sine tone depends on the relative levels of the signals and on the relation of the noise spectral components to the tone. The errors introduced by approximating the frequency components may be viewed as "noise". The noise becomes significantly less audible if its spectral energy is within one critical bandwidth of the tone. Hence, it is advantageous to use frequency decompositions which approximate the critical band structure of the auditory system.*

*Systems which utilize uniform frequency bands are poorly suited for systems designed to take advantage of this type of approximation. In principle, each audio segment can be analyzed to generate a large number of uniform frequency bands, and then, several bands at the higher frequencies could be merged to provide a decomposition into critical bands. This approach imposes the same temporal constraints on all frequency bands. That is, the time window over which the low frequency data is generated for each band is the same as the time window over which each high-frequency band is generated. To provide accuracy in the low frequency ranges, the time window must be very long. This leads to temporal artifacts that become audible at higher frequencies. Hence, systems in which the audio segment is decomposed into uniform sub-bands with adequate low-frequency resolution cannot take full advantage of the critical band properties of the auditory system.*

*Prior art systems that recognize this limitation have attempted to solve the problem by utilizing analysis and synthesis filter banks based on QMF filter banks that analyze a segment of an audio sound track to generate frequency components in two frequency bands. To obtain a decomposition of the segment into frequency components representing the amplitudes of the signal in critical bands, these two frequency based QMF filters are arranged in a tree-structured configuration. That is, each of the outputs of the first level filter becomes the input to another filter bank at least one of whose two outputs is fed to yet another level, and so on. The leaf nodes of this tree provide an approximation to a critical band analysis of the input audio track. It can be shown that this type of filter bank used different length audio segments to generate the different frequency components. That is, a low frequency component represents the signal amplitude in an audio segment that is much longer than a high-frequency component. Hence, the need to choose a single compromise audio segment length is eliminated.*

*While tree structured filter banks having many layers may be used to decompose the frequency spectrum into critical bands, such filter banks introduce significant aliasing artifacts that limit their utility. In a multilevel filter bank, the aliasing artifacts are expected to increase exponentially with the number of levels. Hence, filter banes with large numbers of levels are to be avoided. Unfortunately, filter banks based on QMF filters which divide the signal into two bandlimited signals require large numbers of levels.*

*Prior art audio compression systems are also poorly suited to applications in which the playback of the material is to be carried out on a digital computer. The use of audio for computer applications is increasingly in demand. Audio is being integrated into multimedia applications such as computer based entertainment, training, and demonstration systems. Over the course of the next few years, many new personal computers will be outfitted with audio playback and recording capability. In addition, existing computers will be upgraded for audio with the addition of plug-in peripherals.*

*Computer based audio and video systems have been limited to the use of costly outboard equipment such as an analog laser disc player for playback of audio and video. This has limited the usefulness and applicability of such systems. With such systems it is necessary to provide a user with a highly specialized playback configuration, and there is no possibility of distributing the media electronically. However, personal computer based systems using compressed audio and video data promise to provide inexpensive playback solutions and allow distribution of program material on digital disks or over a computer network.*

*Until recently, the use of high quality audio on computer platforms has been limited due to the enormous data rate required tier storage and playback. Quality has been compromised in order to store the audio data conveniently on*

*disk. Although some increase in performance and some reduction in bandwidth has been gained using conventional audio compression methods, these improvements have not been sufficient to allow playback of high fidelity recordings on the commonly used computer platforms without the addition of expensive special purpose hardware.*

*One solution to this problem-would be to use lower quality playback on computer platforms that lack the computational resources to decode compressed audio material at high fidelity quality levels. Unfortunately, this solution requires that the audio material be coded at various quality levels. Hence, each audio program would need to be stored in a plurality of formats. Different types of users would then be sent the format suited to their application. The cost and complexity of maintaining such multi-format libraries makes this solution unattractive. In addition, the storage requirements of the multiple formats partially defeats the basic goal of reducing the amount of storage needed to store the audio material.*

*Furthermore, the above discussion assumes that the computational resources of a particular playback platform are fixed. This assumption is not always true in practice. The computational resources of a computing system are often shared among a plurality of applications that are running in a time-shared environment. Similarly, communication links between the playback platform and shared storage facilities also may be shared. As the playback resources change, the format of the audio material must change in systems utilizing a multi-format compression approach. This problem has not been adequately solved in prior art systems.*

SUMMARY OF THE INVENTION

The present invention is [a] *also directed toward* communication system for sending a sequence of symbols on a communication link. The system includes a transmitter for placing information indicative of the sequence of symbols on the communication link and a receiver for receiving the information placed on the communication link by the transmitter. The transmitter includes a clock for defining successive frames, each of the frames including M time intervals, where M is an integer greater than 1. A modulator modulates each of the M carrier signals with a signal related to the value of one of the symbols thereby generating a modulated carrier signal corresponding to each of the carrier signals. The modulated carriers are combined into a sum signal which is transmitted on the communication link. The carrier signals include first and second carriers, the first carrier having a different bandwidth than the second carrier. In one embodiment, the modulator includes a tree-structured array of filter banks having M leaf nodes, each of the values related to the symbols forming an input to a corresponding one of the leaf nodes. Each of the nodes includes one of the filter banks. Similarly, the receiver can be constructed of a tree-structured array of sub-band filter banks for converting M time-domain samples received on the communication link to M symbol values.

*The present invention comprises audio compression and decompression systems. An audio compression system according to the present invention converts an audio signal into a series of sets of frequency components. Each frequency component represents an approximation to the audio signal in a corresponding frequency band over a time interval that depends on the frequency band. The received audio signal is analyzed in a tree-structured sub-band analysis filter. The sub-band analysis filter bank comprises a tree-structured array of sub-band filters, the audio signal forming the input of the root node of the tree-structured array and the frequency components being generated at the leaf nodes of the tree-structured array. Each of the sub-band filter banks comprises a plurality of FIR filters having a common input for receiving an input audio signal. Each filter generates an output signal representing the input audio signal in a corresponding frequency band, the number of FIR filters in at least one of the sub-band filter bank is greater than two, and the number of said FIR filters in at least one of the sub-band filters is different than the number of FIR filters in another of the sub-band filters. The frequency components generated by the sub-band analysis filter are then quantized using information about the masking features of the human auditory system.*

*A decompression system according to the present invention regenerates a time-domain audio signal from the sets of frequency components such as those generated by a compression system according to the present invention. The decompression system receives a compressed audio signal comprising sets of frequency components, the number of frequency components in each set being M. The decompression apparatus synthesizes M time domain audio signal values from each of the received set of frequency components. The synthesis sub-system generates 2M polyphase components from the set of frequency components. Then it generates a W entry array from the polyphase phase components and multiples each entry in the array by a corresponding weight value derived from a prototype filter. The time domain audio samples are then generated from the weighted array. The generated samples are stored in a FIFO buffer and outputted to a D/A converter. The FIFO buffer generates a signal indicative of the number of time domain audio signal values stored therein. The rate at which these sample values are outputted to the D/A converters is determined by clock. The preferred embodiment of the decompression system includes a controller that uses the level indicator in the FIFO buffer or other operating system loading parameter to adjust the computational complexity of the algorithm used to synthesize the time domain samples. When the level indicator indicates that the number of time domain samples stored in the FIFO buffer is less than a first predetermined value, the normal synthesis operation is replaced by one that generates an approximation to the time domain samples. This approximation requires a smaller number of computations than would be required to generate the time domain audio signal values. The approximation may be generated by substituting a truncated or shorter prototype filter or by eliminating the contributions of selected frequency components from the computation of the polyphase components. In stereophonic systems, the controller may also switch the synthesis system to a monaural mode based on average frequency components which are obtained by averaging corresponding frequency components for the left and right channels.*

FIG. [4] *16* is a schematic view of a second embodiment of a synthesis filter bank that may be used with the present invention to generate a frequency-domain to time-domain transformation.

FIG. [5] *17* is a schematic view of a second embodiment of an analysis filter bank that may be used with the present invention to generate a time-domain to frequency-domain transformation.

DETAILED DESCRIPTION OF THE INVENTION

Figure 1:
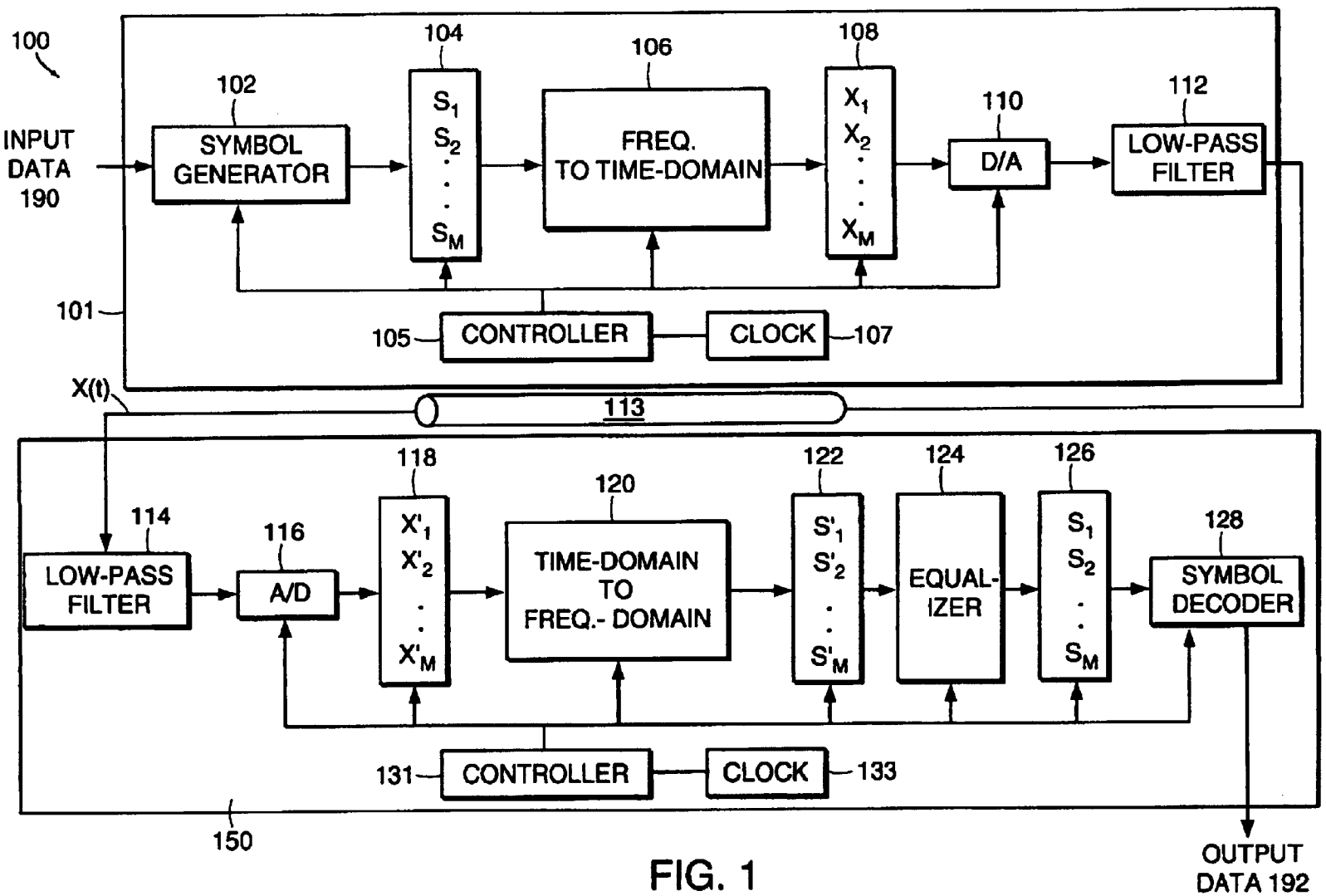
FIG. 1 is a block diagram of a typical prior art multicarrier transceiver.

The manner in which the present invention operates can be more easily understood with reference to FIG. 1 which is a block diagram of a typical prior art multi-carrier transceiver 100. Transceiver 100 transmits data on a communication link 113. The input data stream is received by a symbol generator 102 which converts a run of data bits from the input stream into M symbols $S_1, S_2, \ldots, S_M$ which are stored in a register 104. The number of possible states for each symbol will depend on the noise levels in the corresponding frequency band on the transmission channel 113 and on the error rate that can be tolerated by the data. For the purposes of the present discussion, it is sufficient to note that each symbol is a number whose absolute value may vary from 0 to some predetermined upper bound. For example, if a symbol has 16 possible values, this symbol can be used to represent 4 bits in the input data stream.

Transceiver 100 treats the symbols $S_i$ as if they were the amplitude of a signal in a narrow frequency band. Frequency to time-domain transform circuit 106 generates a time-domain signal $X_i$, for i from 0 to M−1, that has the frequency components $S_i$. The time-domain signals are stored in a shift register 108. The contents of shift register 108 represent, in digital form, the next segment of the signal that is to be actually transmitted over communication link 113. The actual transmission is accomplished by clocking the digital values onto transmission link 113 (possibly after upconversion to radio frequencies) after converting the values to analog voltages using D/A converter 110. Clock 107 provides the timing pulses for the operation. The output of D/A converter 110 is low-pass filtered by filter 112 before being placed on communication link 113.

At the receiving end of transmission link 113, the transmission segment is recovered. The signals received on communication link 113 are low-pass filtered to reduce the effects of high frequency noise transients. The signals are then digitized and shifted into a register 118. When M values have been shifted into register 118, the contents thereof are converted via a time-domain to frequency-domain transform circuit 120 to generate a set of frequency-domain symbols $S'_i$. This transformation is the inverse of the transformation generated by frequency to time-domain transform 106. It should be noted that communication link 113 will, in general, both attenuate and phase shift the signal represented by the $X_i$. Hence, the signal values received at low-pass filter 114 and A/D converter 116 will differ from the original signal values. Thus, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for intersymbol interference arising from synchronization errors between the transmitter and receiver. Finally, the contents of buffer 126 are decoded to regenerate the original data stream by symbol decoder 128.

For efficient design of the equalizer 124 in FIG. 1, each subchannel must be sufficiently narrow to allow the distortions in that subchannel to be modeled by a single phase shift and attenuation. Sub-channels must also be sufficiently narrow to assure that a sub-channel that is turned off to prevent interference from narrow band sources does not unduly waste bandwidth beyond that corrupted by the interference source. However, using narrower channels across the transmission band increases both system latency and the computational complexity of the frequency-domain-to-time-domain transformation and its inverse. The present invention is based on the observation that the variation in the attenuation and phase shift as a function of frequency is greater at low frequencies than at higher frequencies for communication links consisting of twisted pairs or coaxial cable. Thus, it is advantageous from a computational complexity viewpoint to employ narrower subchannels at the low frequencies and wider subchannels at the higher frequencies in a multicarrier modulation system.

To implement a variable channel width system, a transformation that breaks the available frequency band into sub-bands of differing width is required. Such a transformation may be constructed from a tree configured filter bank *discussed hereinafter*. [Tree configured filters are known in the audio compression arts. For example, U.S. Pat. No. 5,408,580, which is hereby incorporated by reference, describes the analysis of] *Specifically, the transformation splits* an audio signal into frequency components representing the audio signal in different frequency bands utilizing such a filter. The frequency bands vary in width such that the lower frequency bands are divided into smaller bands than the higher frequency bands.

Figure 2:
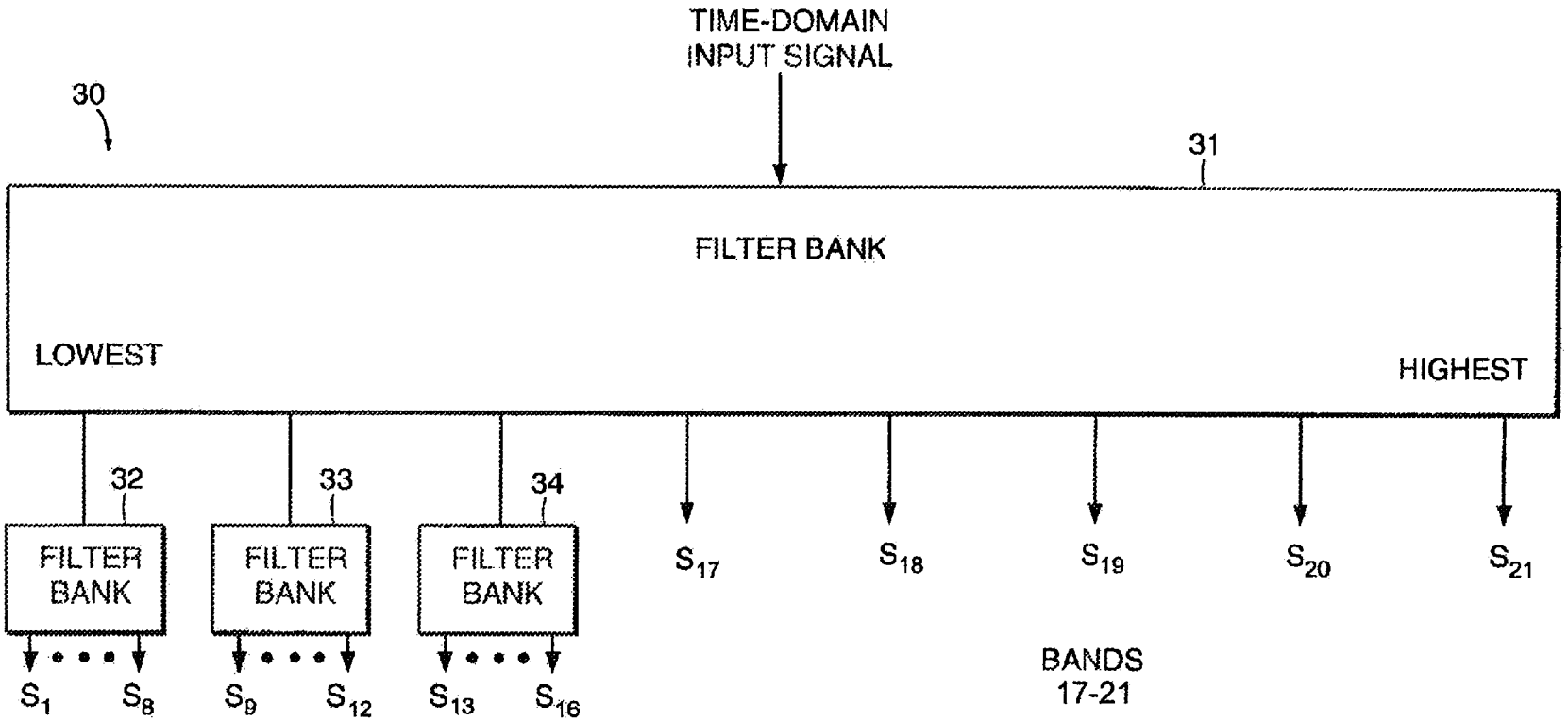
FIG. 2 is a block diagram of a filter bank for performing the time-domain to frequency-domain transformation utilized by the present invention.

Refer now to FIG. 2 which illustrates the decomposition of a signal into frequency sub-bands by a tree structured filter 30. Such a filter could be utilized to implement the time-domain to frequency-domain transformation 120 shown in FIG. 1. Filter 30 includes two levels of filter banks. The manner in which the filter banks are constructed will be discussed in more detail below. In the example shown in FIG. 2, 22 sub-bands are utilized. The decomposition is carried out in two levels of filters. The first level of filter 30 consists of a filter bank 31 which divides the input signal into eight sub-bands of equal size. The second level subdivides the lowest three frequency bands from filter bank 31 into finer subdivisions. The second level consists of three filter banks 32–34. Filter bank 32 divides the lowest sub-band from filter bank 31 into 8 equal sub-bands. Filter bank 33 and filter bank 34 divide the second and third sub-bands created by filter bank 31 into five and four sub-bands respectively. The combination of the two levels generates 22 frequency sub-bands. When applying the tree-structured filter bank to multicarrier communications, the analysis filter bank is used to demodulate the received signal. The filter bank performs a time-domain to frequency-domain transformation, converting received signal amplitudes into demodulated symbols for subsequent equalization.

Figure 3:
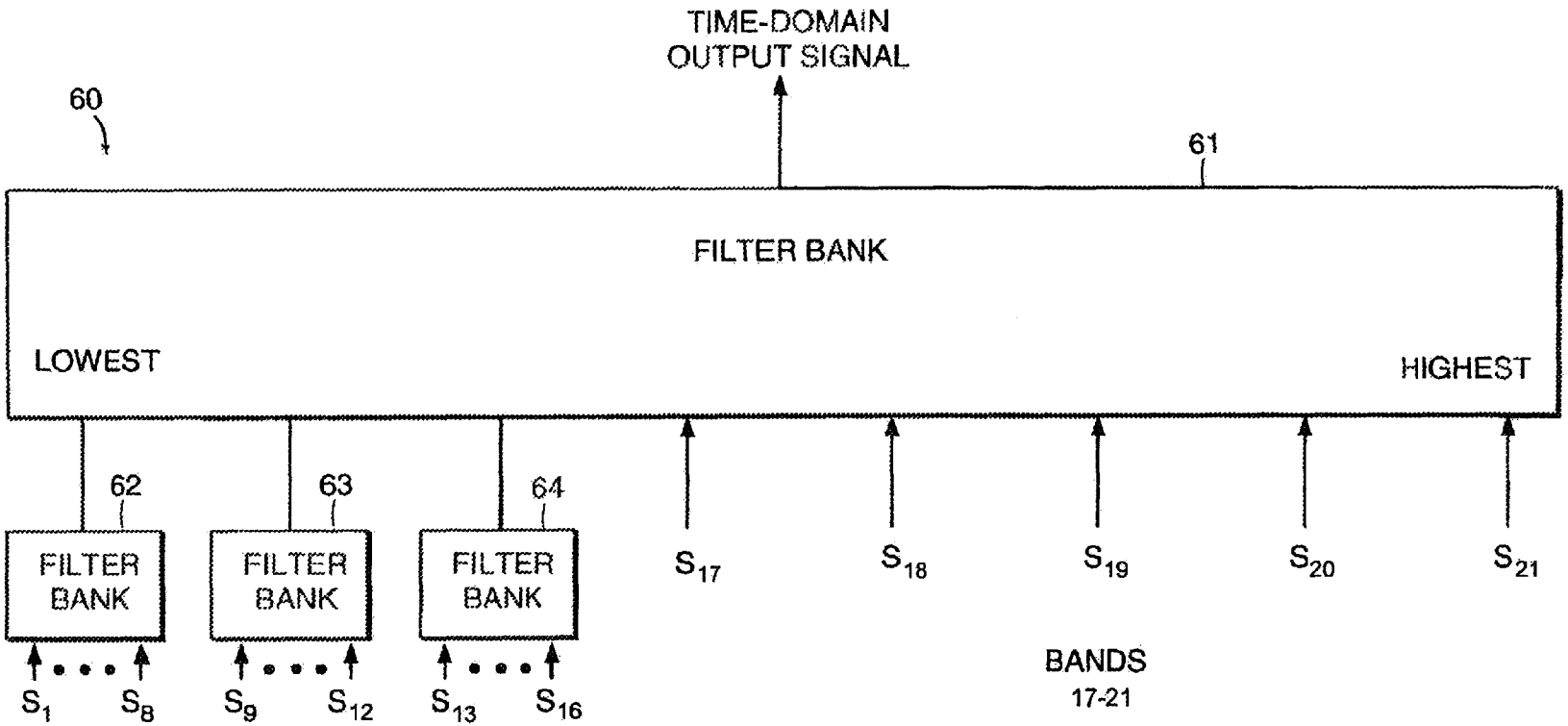
FIG. 3 is a block diagram of a filter bank for performing the frequency-domain to time-domain transformation utilized by the present invention.

The reverse transformation can performed by an analogous filter bank such as shown in FIG. 3 at 60. Filter 60 provides the frequency-domain to time-domain transformation shown in FIG. 1. The reverse transformation also utilizes a two level tree structure. The symbols to be sent on the finer sub-bands are first combined using a first set of synthesis filters shown at 62–64 to provide signals representing three larger sub-bands of the same width as bands 18–22. These "symbols" together with those from bands 18–22 are then combined by synthesis filter 61 to provide the time-domain output signal that is sent on the communication link.

Figure 4:
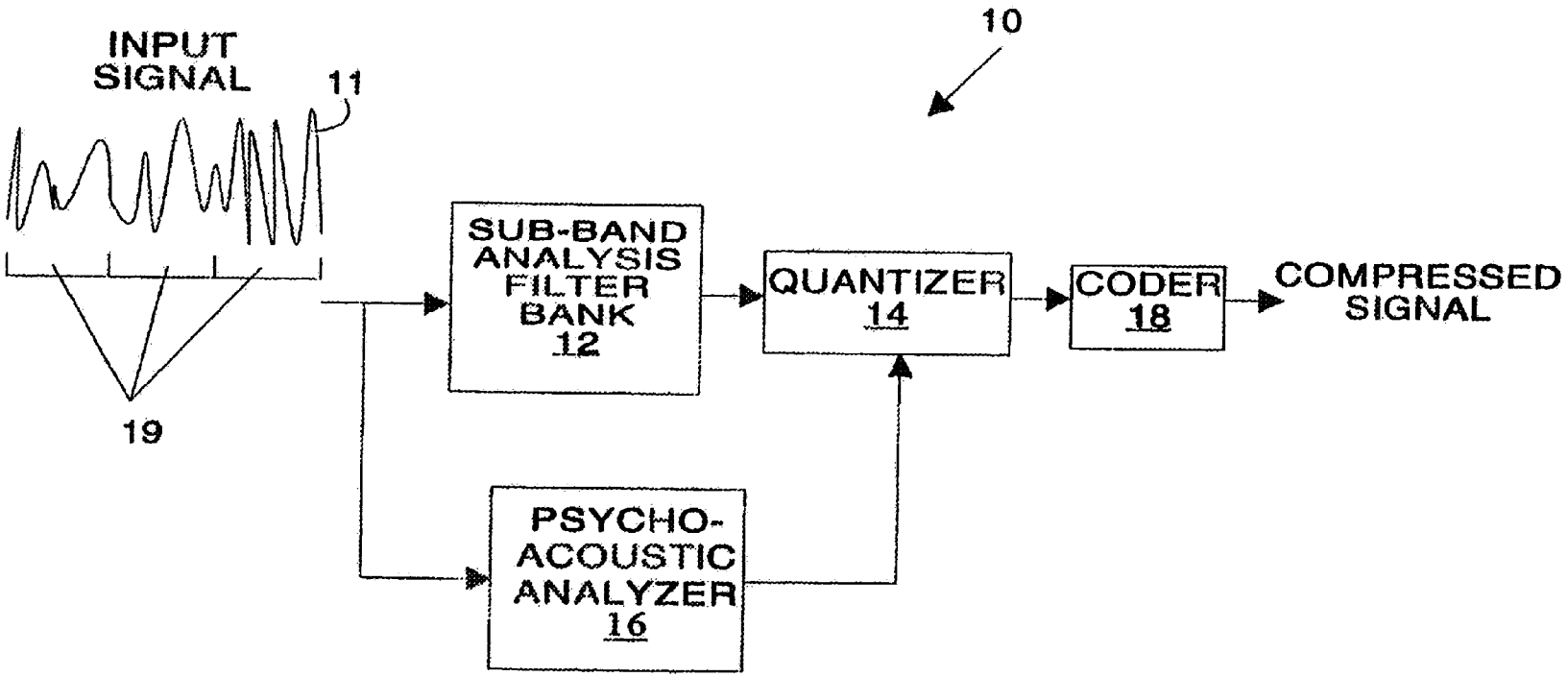
FIGURE 4 (PRIOR ART)
*FIG. 4 is a block diagram of an audio compression system.*

[The manner in which the individual filters are constructed is explained in detail in U.S. Pat. No. 5,408,580, and hence will not be discussed in detail here.] *The manner in which the present invention obtains its advantages over prior art audio compression systems may be more easily understood with reference to the manner in which a conventional audio compression system operates. FIG. 4 is a block diagram of an audio compression system 10 using a conventional sub-band analysis system. The audio compression system accepts an input signal 11 which is divided into a plurality of segments 19. Each segment is analyzed by a filter bank 12 which provides the frequency components for the segment. Each frequency component is a time average of the amplitude of the signal in a corresponding frequency band. The time average is, in general, a weighted average. The frequencies of the sub-bands are uniformly distributed between a minimum and maximum value which depend on the number of samples in each segment 19 and the rate at which samples are taken. The input signal is preferably digital in nature; however, it will be apparent to those skilled in the art that an analog signal may be used by including an analog-to-digital converter prior to filter bank 12.*

*The component waveforms generated by filter bank 12 are replaced by digital approximations by quantizer 14. The number of bits assigned to each amplitude is determined by a psycho-acoustic analyzer 16 which utilizes information about the auditory system to minimize the distortions introduced by the quantization. The quantized frequency components are then further coded by coder 18 which makes use of the redundancy in the quantized components to further reduce the number of bits needed to represent the coded coefficients. Coder 18 does not introduce further errors into the frequency components. Coding algorithms are well known to those skilled in the signal compression arts, and hence, will not be discussed in more detail here.*

*The quantization process introduces errors into the frequency coefficients. A quantization scheme replaces the amplitude of each frequency component by an integer having a finite precision. The number of bits used to represent the integers will be denoted by P. The integers in question are then transmitted in place of the individual frequency components. At the receiver, the inverse of the mapping used to assign the integer values to the frequency components is used to produce amplitudes that are used in place of the original amplitudes for the frequency components. There are at most $2^P$ distinct values that can be represented; hence, if there are more than $2^P$ different frequency component values, at least some of the frequency components will not be exactly recovered. The goal of the quantization algorithm is to minimize the overall effect of the quantization errors on the listener.*

*The errors introduced by the quantization algorithm affect the reconstructed audio track for a time period equal to the length of the segment analyzed to calculate the frequency components. The artifacts introduced by these errors are particularly noticeable in regions of the audio track in which the sound increases or decreases in amplitude over a period of time which is short compared to the length of the segments being analyzed. Because of the rapid rise, the set of frequency components of audio track in the segment will have a number of high-frequency components of significant amplitude which are not present in the segments on either side of the segment in question. Consider a quantization error in one of these high-frequency components. The error is equivalent to adding noise to the original signal. The amplitude of the noise will be determined by the quantization error. This noise will be present for the entire length of the segment in the reconstructed audio track. The noise resulting from the quantization error commences at the boundary of the segment even though the attack begins in the middle of the segment. The amplitude of the noise in the early part of segment may be of the same order of magnitude as the reconstructed audio track; hence, the noise will be particularly noticeable. Since the noise precedes the actual rise in intensity of the audio track, it is perceived as a "pre-echo". If the segment duration is long compared to the rise time of the audio signal, the pre-echo is particularly noticeable. Hence, it would be advantageous to choose filter bands in which the high-frequency components are calculated from segments that are shorter than those used to calculate the low-frequency components. This arrangement avoids the situation in which the segment used to compute high-frequency components is long compared to the rate of change of the component being computed.*

*Low bit rate audio compression systems operate by distributing the noise introduced by quantization so that it is masked by the signal. The ear's sensitivity to a noise source in the presence of a localized frequency component such as a sine tone depends on the relative levels of the signals and on the relation of the noise spectral components to the tone. The noise becomes significantly less audible if its spectral energy is within one critical bandwidth of the tone. Hence, it would be advantageous to choose filter bands that more closely match the critical bands of the human auditory system.*

*The present invention utilizes a filter bank in which different frequency bands utilize different segment lengths. In prior art systems, each segment is analyzed in a bank of*

*finite impulse response filters. The number of samples in the input segment over which each frequency component is computed is the same. The present invention uses different width segments the different frequency components. Ideally, an audio decomposition should exhibit a time and frequency dependency similar to that of human hearing. This may be accomplished by relating the frequency divisions or sub-bands of the decomposition to the critical bandwidths of human hearing. The resulting decomposition has fine frequency resolution with relatively poor temporal resolution at low frequencies, and coarse frequency resolution with fine temporal resolution at high frequencies. As a result, the segment length corresponding to high-frequency components does not greatly exceed the rise time of attacks in the audio track. This reduces the pre-echo artifacts discussed above.*

Figure 5:
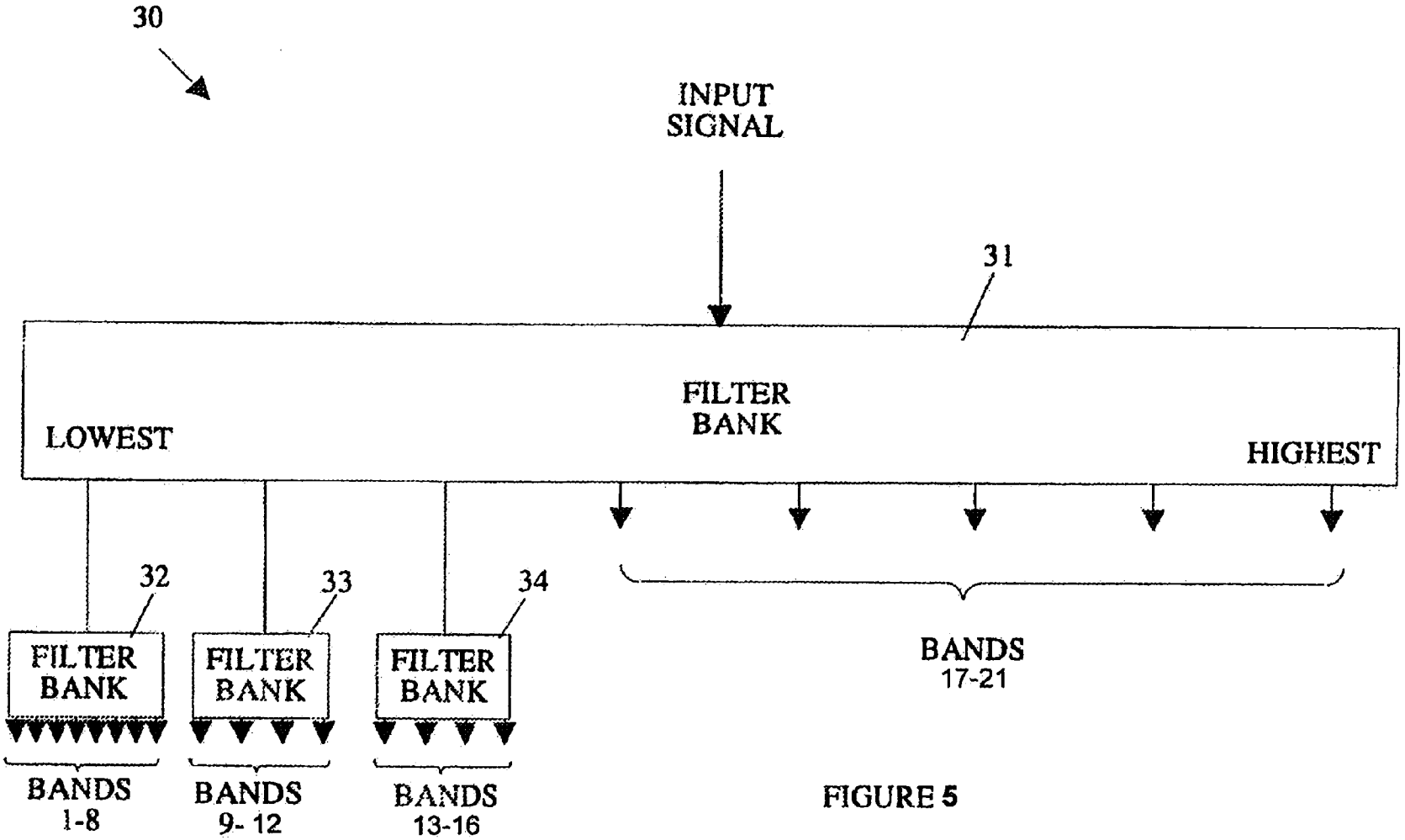
*FIG. 5 is a block diagram of a sub-band decomposition filter according to the present invention.*

*In one embodiment of the present invention, a tree structured decomposition which approximates the ear's time and frequency sensitivity is utilized. This filter may be used to replace sub-band analysis filter bank 12 shown in FIG. 4. A block diagram of a sub-band decomposition filter for carrying out this decomposition is shown at 30 in FIG. 5. Filter 30 includes two levels of filter banks. The manner in which the filter banks are constructed will be discussed in more detail below. For the purposes of the present discussion, it is important to note that the decomposition is carried out with only two levels of filters, and hence, avoids the aliasing problems inherent in QMF filter banks that require many levels. The aliasing problems encountered with QMF filter banks become significant when the number of levels exceeds 4.*

Figure 6:
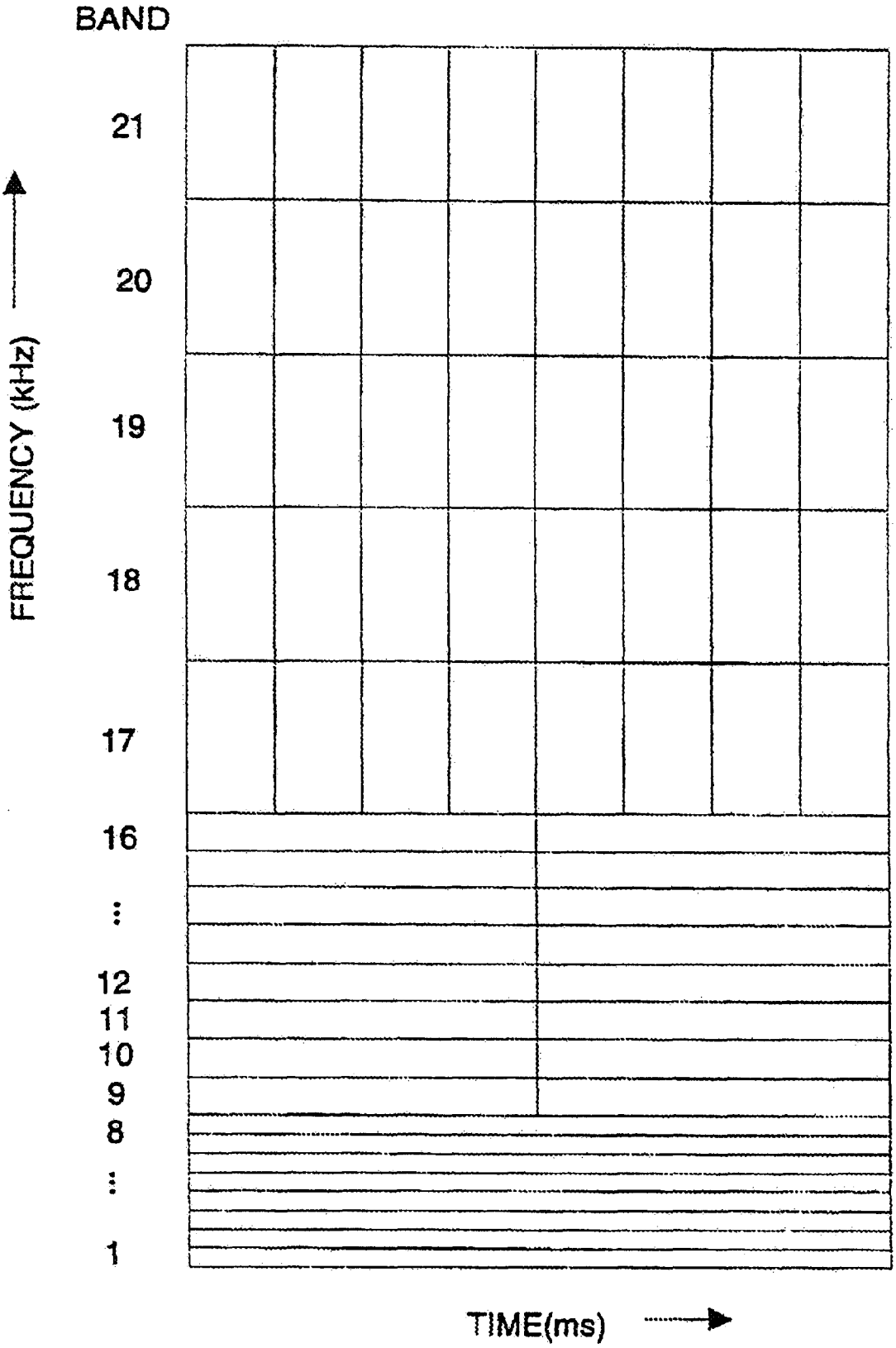
*FIG. 6 illustrate the relationship between the length of the segment of the original audio signal used to generate the frequency of each sub-band and the bandwidth of each band.*

*The first level of filter 30 consists of a filter bank 31 which divides the input signal into eight sub-bands of equal size. The second level sub-divides the lowest three frequency bands from filter bank 31 into finer sub-divisions. The second level consists of three filter banks 32-34. Filter bank 32 divides the lowest sub-band from filter bank 31 into 8 equal sub-bands. Filter bank 33 and filter bank 34 divide the second and third sub-bands created by filter bank 31 into four sub-bands. The combination of the two levels generate 21 frequency sub-bands. The relationship between the length of the segment of the original audio signal used to generate the frequency and phase of each sub-band and the bandwidth of each band is shown schematically in FIG. 6. The lower frequencies, bands 1-8, have the finest frequency resolution, but the poorest temporal resolution. The highest frequencies, bands 17-21, have the poorest frequency resolution, but the finest time resolution. This arrangement more nearly approximates the ear's sensitivity than systems utilizing filter banks in which all bands have the same temporal resolution, while avoiding the aliasing problems inherent in tree-structured filters having many levels of filters.*

*While quantization errors in each of the amplitudes still introduces noise, the noise spectrum obtained with this embodiment of the present invention is less objectionable to a human listener than that obtained with prior art systems. As noted above, prior art systems tend to have a noise spectrum which changes abruptly at the segment boundaries. In the present invention, the amplitude of the quantization noise can switch more rapidly at higher frequencies. If the length of the low frequency segments is denoted by T, then the medium frequencies are measured on segments that are T/2, and the highest frequencies are measured on segments that are T/8 in length. The quantization noise is the sum of all of the quantization errors in all of the frequency bands. As a result, the quantization noise changes every T/8. To obtain the same resolution in the low frequency components, a conventional filter system would measure all of the frequency components on segments of length T. Hence, the prior art would introduce quantization noise which changes abruptly every T samples. The present invention introduces a more gradual change in the noise level in the T/8 interval for the high and medium sub-bands thus giving less perceptible distortion at higher frequencies.*

*The manner in which the input signal is divided into segments can effect the quality of the regenerated audio signal. Consider the case in which the signal is analyzed on segments that do not overlap. This analysis is equivalent to employing a model in which the regenerated signal is produced by summing the signals of a number of harmonic oscillators whose amplitudes remain constant over the duration of the segment on which each amplitude was calculated. In general, this model is a poor approximation to an actual audio track. In general, the amplitudes of the various frequency components would be expected to change over the duration of the segments in question. Models that do not take this change into account will have significantly greater distortions than models in which the amplitudes can change over the duration of the segment, since there will be abrupt changes in the amplitudes of the frequency components at each segment boundary.*

Figure 7:
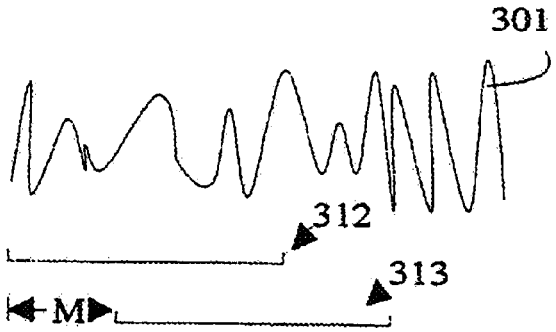
*FIG. 7 illustrates the relationship between successive overlapping segments of an audio signal.*

*One method for reducing the discontinuities in the frequency component amplitudes at the segment boundaries is to employ a sub-band analysis filter that utilizes overlapping segments to generate successive frequency component amplitudes. The relationship of the segments is shown in FIG. 7 for a signal 301. The sub-band analysis filter generates M frequency components for signal 301 for each M signal values. However, each frequency component is generated over a segment having a duration much greater than M. Each component is generated over a segment having a length of W sample values, where W>M. Typical segments are shown at 312 and 313. It should be noted that successive segments overlap by (W−M) samples.*

Figure 8A:
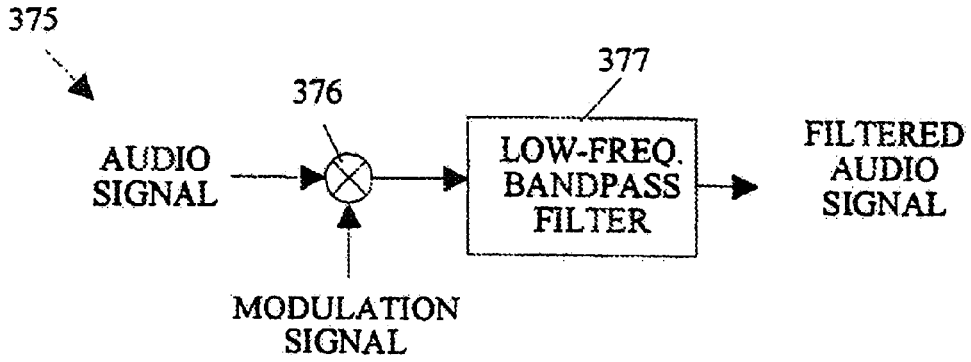
*FIG. 8(a) is a block diagram of an audio filter based on a low-frequency filter and a modulator.*

*In the preferred embodiment of the present invention, the various frequency bands in a sub-band analysis filter bank have the same shape but are shifted relative to one another. This arrangement guarantees that all frequency bands have the same aliasing properties. Such a filter bank can be constructed from a single low frequency band pass filter having the desired band shape. The manner in which the various filter bands are constructed is most easily understood with reference to FIG. 8(a) which is a block diagram of a single filter constructed from a low-frequency bandpass filter 377 and a mixer 376. Assume that the low-pass filter 377 has a center frequency of Fc and that the desired center frequency of filter 350 is to be F. Then by shifting the input audio signal by a frequency of F−Fc prior to analyzing the signal with low-frequency bandpass filter 377, the output of low-frequency bandpass filter 377 will be the amplitude of the audio signal in a band having a center frequency of F. Modulator 376 accomplishes this frequency shift.*

*A filter bank can then be constructed from a single prototype low-frequency bandpass filter by using different modulation frequencies to shift the incoming audio signal prior to analysis by the prototype filter. While such a filter bank can be constructed from analog circuit components, it is difficult to obtain filter performance of the type needed. Hence, the preferred embodiment of the present invention utilizes digital filter techniques.*

Figure 8B:
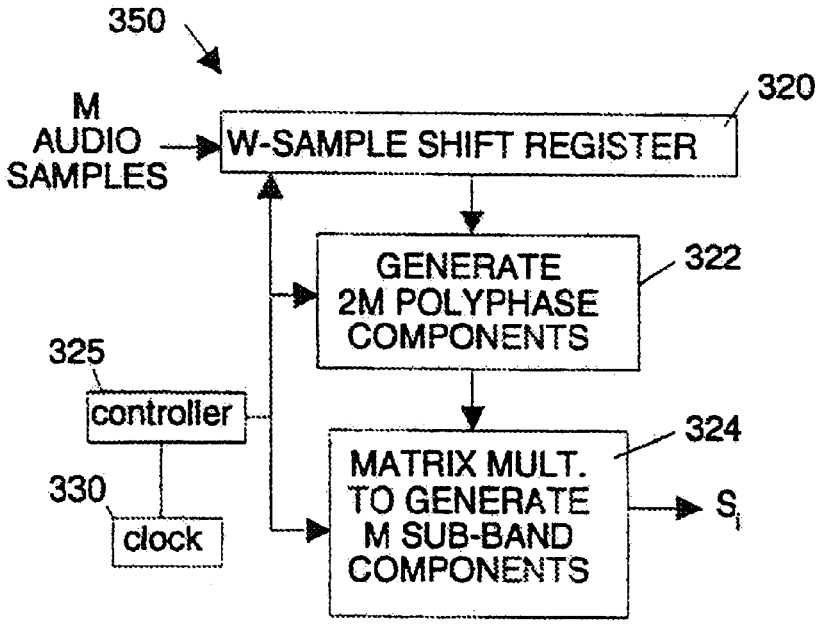
*FIG. 8(b) is a block diagram of a sub-band analysis filter for generating a set of frequency components.*

*A block diagram of a sub-band analysis filter 350 for generating a set of M frequency components, $S_p$ from a W* sample window is shown in FIG. 8(b). The M audio samples are clocked into a W-sample shift register 320 by controller 325. The oldest M samples in shift register 320 are shifted out the end of the shift register and discarded. The contents of the shift register are then used to generate 2M polyphase components $P_k$, for k=0 to 2M−1. The polyphase components are generated by a windowing operation followed by partial summation. The windowing operation generates a W-component array $Z_i$ from the contents of shift register 320 by multiplying each entry in the shift register by a corresponding weight, i.e., $$Z_i = h_i * x_i \tag{1}$$

where the $x_i$, for i=0 . . . W−1 are the values stored in shift register 320, and the $h_i$ are coefficients of a low pass prototype filter which are stored in controller 325. For those wishing a more detailed explanation of the process for generating sets of filter coefficients, see J. Rothweiler, "POLYPHASE QUADRATURE FILTERS—A NEW SUB-BAND CODING TECHNIQUE" IEEE Proceedings of the 1983 ICASSP Conference, pp 1280-1283. The polyphase components are then generated from the $Z_i$ by the following summing operations:

$$P_k = \sum_{j=0}^{2M} Z_{i+2Mj} \tag{2}$$

The frequency components, $S_i$, are obtained via the following matrix multiplication from the polyphase components $$S_i = \sum_{k=0}^{2M-1} P_k \cos\left[\frac{(2i+1)(k-M/2)\pi}{2M}\right] \tag{3a}$$

This operation is equivalent to passing the polyphase components through M finite impulse response filters of length 2M. The cosine modulation of the polyphase components shown in Eq. (3a) may be replaced by other such modulation terms. The form shown in Eq. (8a) leads to near-perfect reconstruction. An alternative modulation scheme which allows for perfect reconstruction is as follows:

$$S_i = \sum_{k=0}^{2M-1} P_k \cos\left[\frac{(2i+1)(2k+1-M)\pi}{4M}\right] \tag{3b}$$

It can be seen by comparison to FIG. 5(a) that the matrix multiplication provides an operation analogous to the modulation of the incoming audio signal. The windowing operation performs the analysis with the prototype low-frequency filter.

As will be discussed in more detail below, the computational workload in analyzing and synthesizing audio tracks, of a great importance in providing systems that can operate on general purpose computing platforms. It will be apparent from the above discussion that the computational workload inherent in generating M frequency components from a window of W audio sample values is approximately $(W+2M^2)$ multiplies and adds. In this regard, it should be noted that a two level filter bank of the type used in the present invention significantly reduces the overall computational workload even in situations in which the frequency spectrum is to be divided into uniform bands. For example, consider a system in which the frequency spectrum is to be divided into 64 bands utilizing a window of 512 samples. If a prior art one level filter bank is utilized, the workload will be approximately 8,704 multiplies and adds. If the filter bank is replaced by a two level filter bank according to the present invention, then the filter bank will consist of 9 filter banks, each dividing the frequency spectrum into 8 bands. The computational workload inherent in this arrangement is only 5,760 multiplies and adds. Hence, a filter bank according to the present invention typically requires less computational capability than a one level filter bank according to the prior art. In addition, a filter bank according to the present invention also provides a means for providing a non-uniform band structure.

The transformation of the audio signal into sets of frequency components as described above does not, in itself, result in a decrease in the number of bits needed to represent the audio signal. For each M audio samples received by a sub-band analysis filter, M frequency components are generated. The actual signal compression results from the quantization of the frequency components. As noted above, the number of bits that must be allocated to each frequency component is determined by a phenomena known as "masking". Consider a tone at a frequency f. The ability of the ear to detect a signal at frequency f' depends on the energy in the tone and difference in frequency between the signal and the tone, i.e., (f−f'). Research in human hearing has led to measurements of a threshold function T(E,f,f') which measures the minimum energy at which the second frequency component can be detected in the presence of the first frequency component with energy E. In general, the threshold function will vary in shape with frequency.

The threshold function is used to construct a masking function as follows. Consider a segment of the incoming audio signal. Denote the energy as a function of frequency in this segment by E(t). Then a mask level, L(f), is constructed by convolving E(f) and T(f,f'), i.e., $$L(f) = \int T(E(f'),f,f')E(f')df \tag{4}$$

Consider the filtered signal value in a band $f_0 \pm \Delta f$. Denote the minimum value of L in this frequency band by $L_{min}$. It should be noted that $L_{min}$ may depend on frequency components outside the band in question, since a peak in an adjacent band may mask a signal in the band in question.

According to the masking model, any noise in this frequency band that has an energy less than $L_{min}$ will not be perceived by the listener. In particular, the noise introduced by replacing the measured signal amplitude in this band by a quantized approximation therefore will not be perceived if the quantization error is less than $L_{min}$. The noise in question will be less than $L_{min}$ if the signal amplitude is quantized to accuracy equal to $S/L_{min}$, where S is the energy of the signal in the band in question.

The above-described quantization procedure requires a knowledge of frequency spectrum of the incoming audio signal at a resolution which is significantly greater than that of the sub-analysis of the incoming signal. In general, the minimum value of the mask function L will depend on the precise location of any peaks in the frequency spectrum of the audio signal. The signal amplitude provided by the sub-band analysis filter measures the average energy in the frequency band; however, it does not provide any information about the specific location of any spectral peaks within the band.

Hence, a more detailed frequency analysis of the incoming audio signal is required. This can be accomplished by

*defining a time window about each filtered signal component and performing a frequency analysis of the audio samples in this window to generate an approximation to E(f). In prior art systems, the frequency analysis is typically performed by calculating a FFT of the audio samples in the time window.*

*In one embodiment of a quantization sub-component according to the present invention, this is accomplished by further subdividing each sub-band using another layer of filter banks. The output of each of the sub-band filters in the analysis filter bank is inputted to another sub-band analysis filter which splits the original sub-band into a plurality of finer sub-bands. These finer sub-bands provide a more detailed spectral measurement of the audio signal in the frequency band in question, and hence, can be used to compute the overall mask function L discussed above.*

*While a separate $L_{min}$ value may be calculated for each filtered signal value from each sub-band filter, the preferred embodiment of the present invention operates on blocks of filtered signal values. If a separate quantization step size is used for each filtered value, then the step size would need to be communicated with each filtered value. The bits needed to specify the step size reduce the degree of compression. To reduce this "overhead", a block of samples is quantized using the same step size. This approach reduces the number of overhead bits/sample, since the step size need only be communicated once. The blocks of filtered samples utilized consist of a sequential set of filtered signal values from one of the sub-band filters. As noted above, these values can be inputted to a second sub-band analysis filter to obtain a fine spectral measurement of the energy in the sub-band.*

Figure 9:
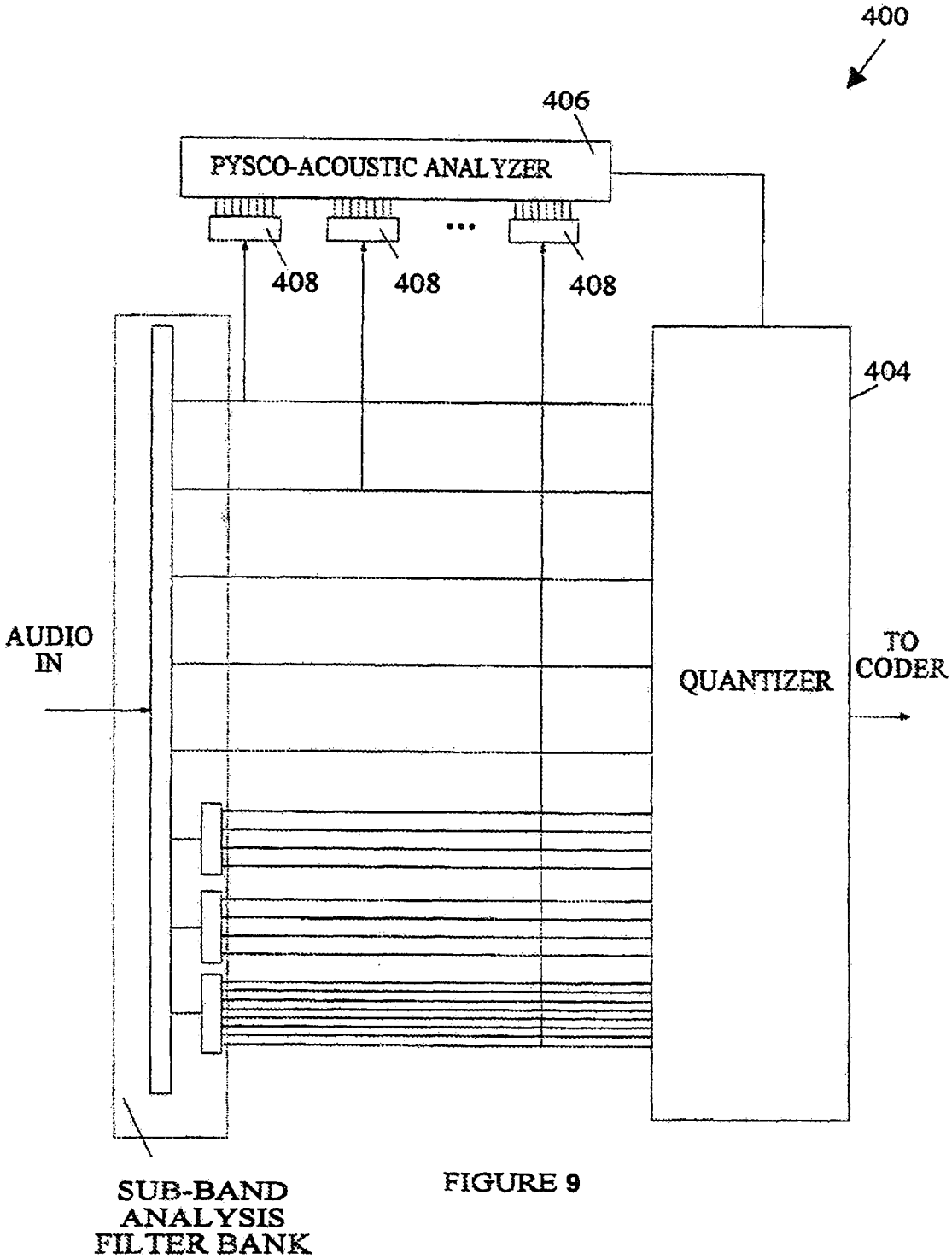
*FIG. 9 illustrates the manner in which a sub-band analysis filter may be utilized to obtain the frequency information needed for psycho-acoustical analysis of the audio signal prior to quantization.*

*One embodiment of such a system is shown in FIG. 9 at 400. The audio signal values are input to a sub-band analysis filter 402 which is similar to that shown in FIG. 5. The filtered outputs are quantized by quantizer 404 in blocks of 8 values. Each set of 8 values leaving sub-band analysis filter 402 is processed by a sub-band analysis filter 408 to provide a finer spectral measurement of the audio signal. Subband analysis filters 408 divide each band into 8 uniform sub-bands. The outputs of sub-band analysis filters 408 are then used by psycho-acoustic analyzer 406 to determine the masking thresholds for each of the frequency components in the block. While the above embodiment splits each band into 8 sub-bands for the purpose of measuring the energy spectrum, it will be apparent to those skilled in the art that other numbers of sub-bands may be used. Furthermore, the number of sub-bands may be varied with the frequency band.*

Figure 10:
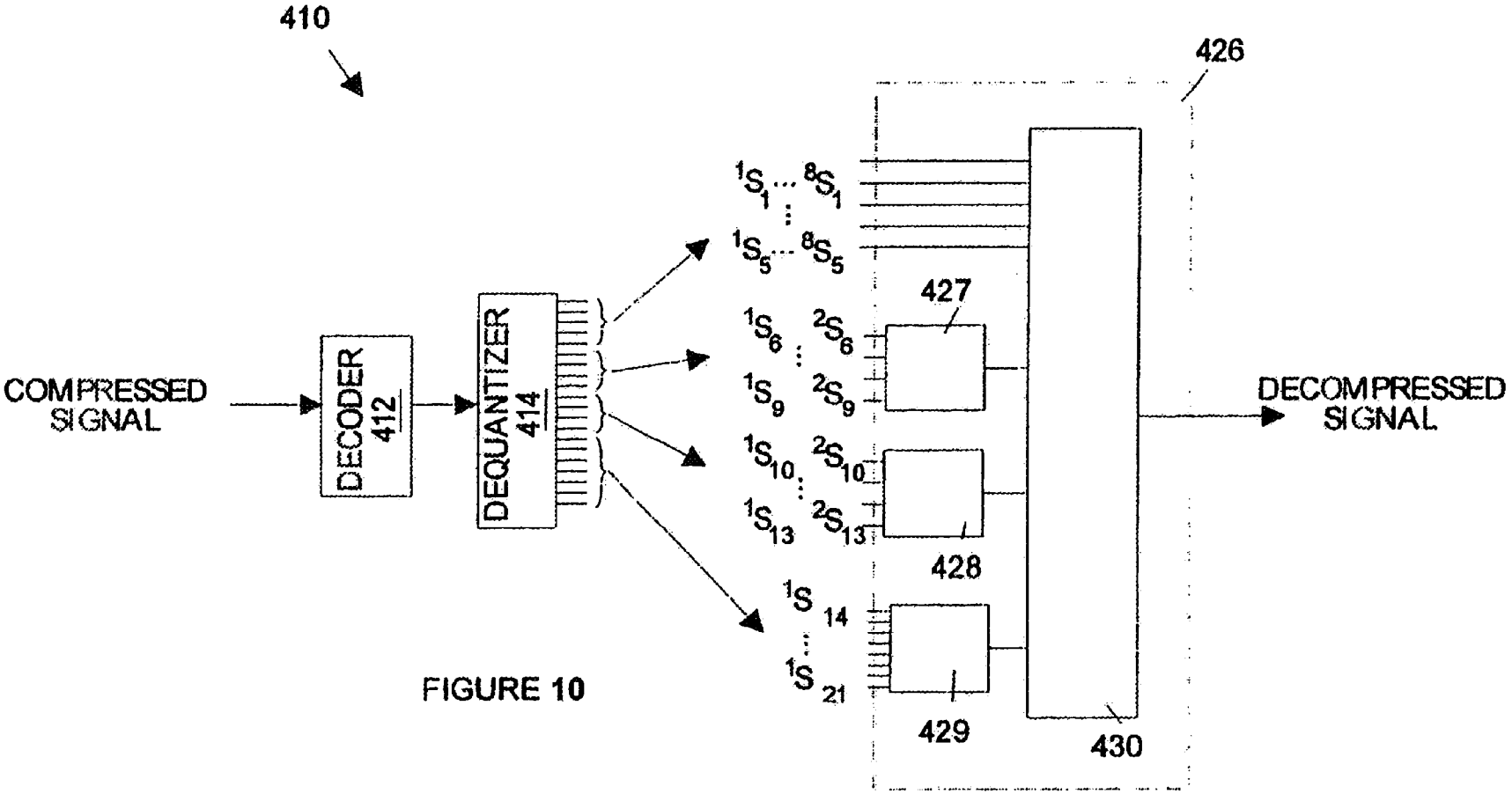
*FIG. 10 is a block diagram of an audio decompression system for decompressing the compressed audio signals generated by a compression system.*

*The manner in which an audio decompression system according to the present invention operates will now be explained with the aid of FIG. 10 which is a block diagram of an audio decompression system 410 for decompressing the compressed audio signals generated by a compression system such as that shown in FIG. 9. The compressed signal is first decoded to recover the quantized signal values by a decoder 412. The quantized signal values are then used to generate approximations to the filtered signal value by de-quantizer 414. Since the present invention utilizes multi-rate sampling, the number of filtered signal values depends on the specific frequency bands. In the case in point, there are 21 such bands. As discussed above, the five highest bands are sampled at 8 times the rate of the lowest 8 frequency bands, and the intermediate frequency bands are sampled at twice the rate of the lowest frequency bands. The filtered signal values are indicated by ${}^{k}S_{m}$, where m indicates the frequency band, and k indicates the number of the signal value relative to the lowest frequency bands, i.e., k runs from 1 to 8 for the highest frequency bands, and 1 to 2 for the intermediate frequency bands.*

*The filtered samples are inputted to an inverse sub-band filter 426 which generates an approximation to the original audio signal from the filtered signal values. Filter 402 shown in FIG. 9 and filter 426 form a perfect, or near perfect, reconstruction filter bank. Hence, if the filtered samples had not been replaced by approximation thereto by quantizer 404, the decompressed signal generated by filter bank 426 would exactly match the original audio signal input to filter 402 to a specified precision.*

*Inverse sub-band filter bank 426 also comprises a tree-structured filter bank. To distinguish the filters used in the inverse sub-band filters from those used in the sub-band filter banks which generated the filtered audio samples, the inverse filter banks will be referred to as synthesizers. The filtered signal values enter the tree at the leaf nodes thereof, and the reconstructed audio signal exits from the root node of the tree. The low and intermediate filtered samples pass through two levels of synthesizers. The first level of synthesizers are shown at 427 and 428. For each group of four filtered signal values accepted by synthesizers 427 and 428, four sequential values which represent filtered signal values in a frequency band which is four times wider are generated. Similarly, for each group of eight filtered signal values accepted by synthesizer 429, eight sequential values which represent filtered signal values in a frequency band which is eight times as wide are generated. Hence, the number of signal values entering synthesizer 430 on each input is now the same even though the number of signal values provided by de-quantizer 414 for each frequency band varied from band to band.*

*The synthesis of the audio signal from the sub-band components is carried out by analogous operations. Given M sub-band components that were obtained from 2M polyphase components $P_i$, the original polyphase components can be obtained from the following matrix multiplication:*

$$P_i = \sum_{k=0}^{M-1} S_k \cos\left[\frac{\left(i+\frac{M}{2}\right)(2k+1)\pi}{2M}\right] \tag{5a}$$

*As noted above, there are a number of different cosine modulations that may be used. Eq. (5a) corresponds to modulation using the relationship shown in Eq. 3(a). If the modulation shown in Eq. 3(b) is utilized, then the polyphase components are obtained from the following matrix multiplication:*

$$P_i = \sum_{k=0}^{M-1} S_k \cos\left[\frac{(2i+1+M)(2k+1)\pi}{4M}\right] \tag{5b}$$

Figure 11:
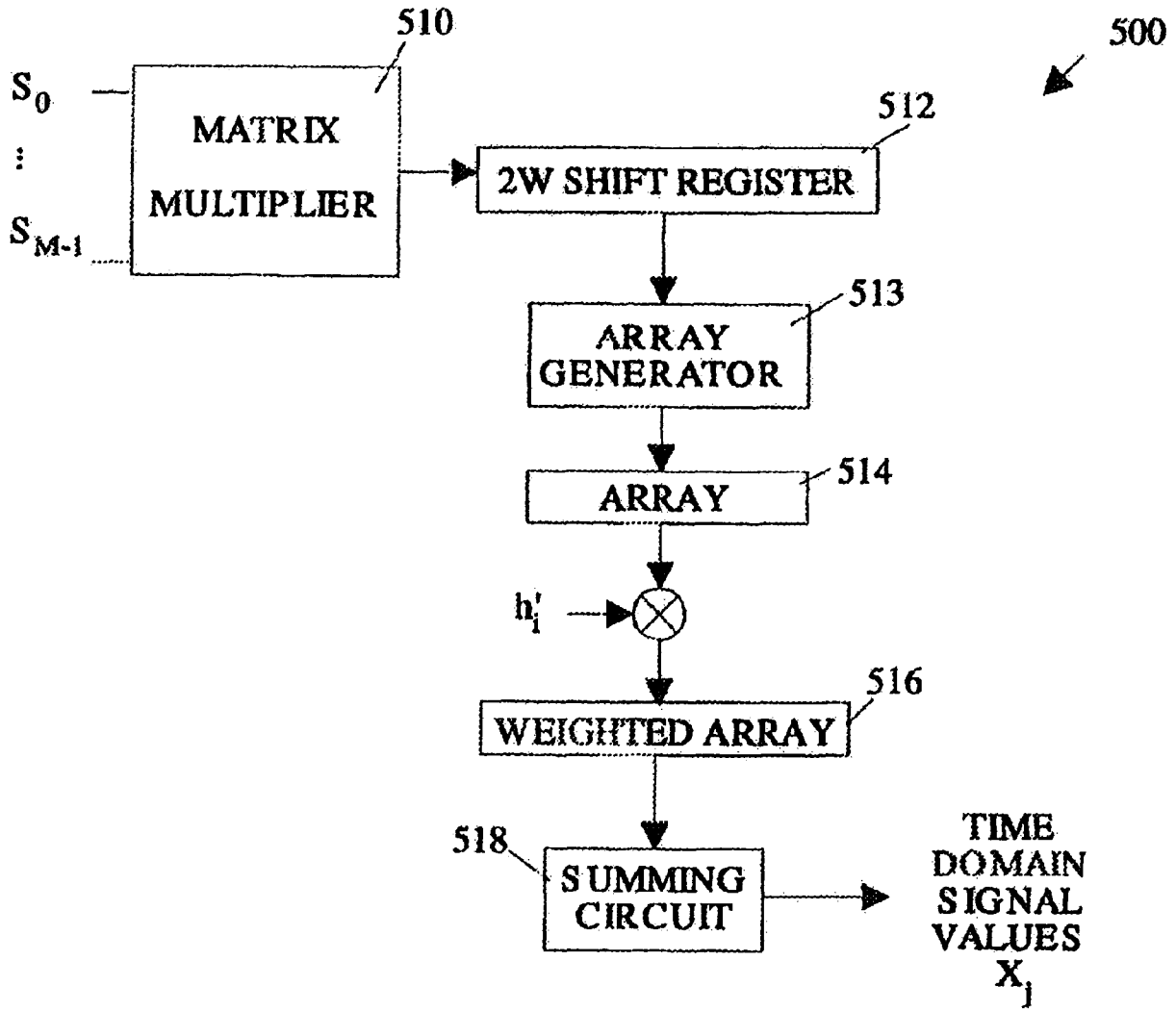
*FIG. 11 is a block diagram of a synthesizer according to the present invention.*

*The time domain samples $x_k$ are computed from the polyphase components by the inverse of the windowing transform described above. A block diagram of a synthesizer according to the present invention is shown in FIG. 11 at 500. The M frequency components are first transformed into the corresponding polyphase components by a matrix multiplication shown at 510. The resultant 2M polyphase components are then shifted into a 2W entry shift register 512 and the oldest 2M values in the shift register are shifted out and discarded. The contents in the shift register are inputted to array generator 513 which builds a W value array 514 by iterating the following loop 8 times: take the first M samples from shift register 512, ignore the next 2M samples, then take the next M samples. The contents of array 514 are then*

*multiplied by W weight coefficients, $h'_i$ which are related to the $.h_{sub.}i$ used in the corresponding sub-band analysis filter to generate a set of weighted values$_{wi}$=$h'_i$*$u_i$, which are stored in array 516. Here the $u_i$ are the contents of array 514. The M time domain samples, $x_i$ for j=0, . . . M−1, are then generated by summing circuit 518 which sums the appropriate $w_i$ values, i.e.,*

$$x_j = \sum_{i=0}^{W/M-1} w_{j+Mi} \tag{6}$$

*While the above-described embodiments of synthesizers and sub-band analysis filters are described in terms of special purpose hardware for carrying out the various operations, it will be apparent to those skilled in the art that the entire operation may be carried out on a general purpose digital computer.*

*As pointed out above, it would be advantageous to provide a single high-quality compressed audio signal that could be played back on a variety of playback platforms having varying computational capacities. Each such playback platform would reproduce the audio material at a quality consistent with the computational resources of the platform.*

*Furthermore, the quality of the playback should be capable of being varied in real time as the computational capability of the platform varies. This last requirement is particularly important in playback systems comprising multi-tasking computers. In such systems, the available computational capacity for the audio material varies in response to the computational needs of tasks having equal or higher priority. Prior art decompression systems due not provide this capability.*

*The present invention allows the quality of the playback to be varied in response to the computational capability of the playback platform without the use of multiple copies of the compressed material. Consider an audio signal that has been compressed using a sub-band analysis filter bank in which the window contains W audio samples. The computational workload required to decompress the audio signal is primarily determined by the computations carried out by the synthesizers. The computational workload inherent in a synthesizer is W multiplies and adds from the windowing operations and $2M^2$ multiplies and adds from the matrix multiplication. The extent to which the filters approximate an ideal band pass filter, in general, depends on the number samples in the window, i.e., W. As the number of samples increases, the discrepancy between the sub-band analysis filter performance and that of an ideal band pass filter decreases. For example, a filter utilizing 128 samples has a side lobe suppression in excess of 48 dB, while a filter utilizing 512 samples has a side lobe suppression in excess of 96 dB. Hence, synthesis quality can be traded for a reduction in computational workload if a smaller window is used for the synthesizers.*

*In the preferred embodiment of the present invention, the size of the window used to generate the sub-band analysis filters in the compression system is chosen to provide filters having 96 dB rejection of signal energy outside a filter band. This value is consistent with playback on a platform having 16 bit D/A converters. In the preferred embodiment of the present invention, this condition can be met by 512 samples. The prototype filter coefficients, $h_i$, viewed as a function of i have a more or less sine-shaped appearance with tails extending from a maximum. The tails provide the corrections which result in the 96 dB rejection. If the tails are truncated, the filter bands would have substantially the same bandwidths and center frequencies as those obtained from the non-truncated coefficients. However, the rejection of signal energy outside a specific filter's band would be less than the 96 dB discussed above. As a result, a compression and decompression system based on the truncated filter would show significantly more aliasing than the non-truncated filter.*

*The present invention utilizes this observation to trade sound quality for a reduction in computational workload in the decompression apparatus. In the preferred embodiment of the present invention, the audio material is compressed using filters based on a non-truncated prototype filter. When the available computational capacity of the playback platform is insufficient to provide decompression using synthesis filters based on the non-truncated prototype filter, synthesizers based on the truncated filters are utilized. Truncating the prototype filter leads to synthesizers which have the same size window as those based on the non-truncated prototype. However, many of the filter coefficients used in the windowing operation are zero. Since the identity of the coefficients which are now zero is known, the multiplications and additions involving these coefficients can be eliminated. It is the elimination of these operations that provides the reduced computational workload.*

*It should be noted that many playback platforms use D/A converters with less than 16 bits. In these cases, the full 96 dB rejection is beyond the capability of the platform; hence, the system performance will not be adversely effected by using the truncated filter. These platforms also tend to be the less expensive computing systems, and hence, have lower computational capacity. Thus, the trade-off between computational capacity and audio quality is made at the filter level, and the resultant system provides an audio quality which is limited by its D/A converters rather than its computational capacity.*

*Another method for trading sound quality for a reduction in computational workload is to eliminate the synthesis steps that involve specific high-frequency components. If the sampled values in one or more of the high-frequency bands are below some predetermined threshold value, then the values can be replaced by zero. Since the specific components for which the substitution is made are known, the multiplications and additions involving these components may be eliminated, thereby reducing the computational workload. The magnitude of the distortion generated in the reconstructed audio signal will, of course, depend on the extent of the error made in replacing the sampled values by zeros. If the original values were small, then the degradation will be small. This is more often the case for the high-frequency filtered samples than for the low frequency filtered samples. In addition, the human auditory system is less sensitive at high frequencies; hence, the distortion is less objectionable.*

*It should also be noted that the computational workload inherent in decompressing a particular piece of audio material varies during the material. For example, the high-frequency filtered sampled may only have a significant amplitude during pans of the sound track. When the high-frequency components are not present or sufficiently small to be replaced by zeros without introducing noticeable distortions, the computational workload can be reduced by not performing the corresponding multiplications and additions. When the high-frequency components are large, e.g., during attacks, the computational workload is much higher.*

*It should be noted that the computational work associated with generating the $P_k$ values from the $S_i$ values can be*

*organized by $S_i$. That is, the contribution to each $P_k$ from a given $S_i$ is calculated, then the contribution to each $P_k$ from $S_{i+1}$, and so on. Since there are 2M P values involved with each value of S, the overhead involved in testing each value of S before proceeding with the multiplications and additions is small compared to the computations saved if a particular S value is 0 or deemed to be negligible. In the preferred embodiment of the present invention, the computations associated with $S_i$ are skipped if the absolute value of $S_i$ is less than some predetermined value, ϵ.*

*Because of the variation in workload, the preferred embodiment of the present invention utilizes a buffering system to reduce the required computational capacity from that needed to accommodate the peak workload to that need to accommodate the average workload. In addition, this buffering facilitates the use of the above-described techniques for trading off the required computational capacity against sound quality. For example, when the computational workload is determined to be greater than that available, the value of .epsilon. can be increased which, in turn, reduces the number of calculations needed to generate the $P_k$ values.*

Figure 12:
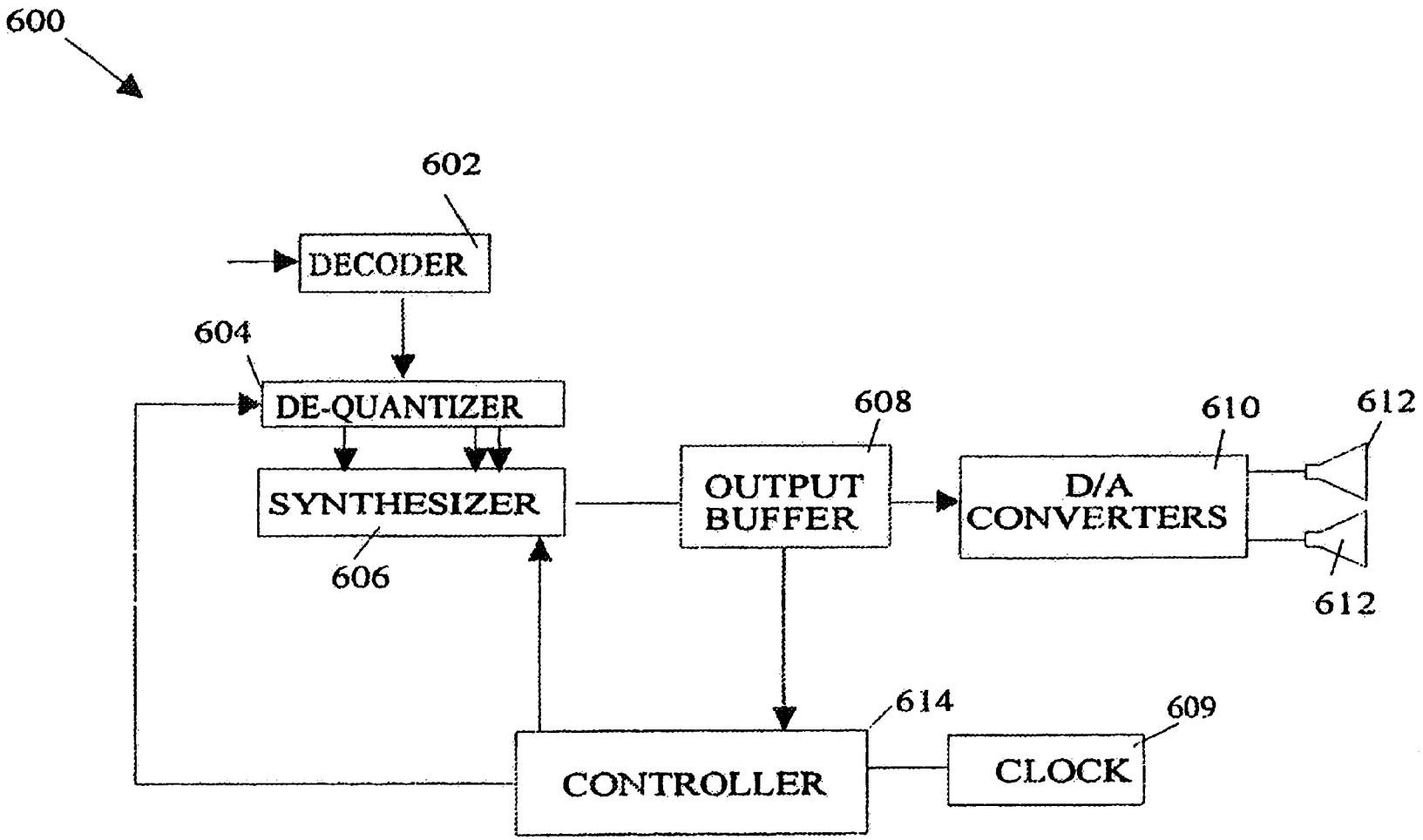
*FIG. 12 is a block diagram of an audio decompression system utilizing the variable computational load techniques of the present invention.*

*A block diagram of an audio decompression system utilizing the above-described variable computational load techniques is shown in FIG. 12 at 600. The incoming compressed audio stream is decoded by decoder 602 and de-quantizer 604 to generate sets of frequency components $\{S_i\}$ which are used to reconstruct the time domain audio signal values. The output of synthesizer 606 is loaded into a FIFO buffer 608 which feeds a set of D/A converters 610 at a constant rate determined by clock 609. The outputs of the D/A converters are used to drive speakers 612. Buffer 608 generates a signal that indicates the number of time domain samples stored therein. This signal is used by controller 614 to adjust the parameters that control the computational complexity of the synthesis operations in synthesizer 606. When this number falls below a predetermined minimum value, the computational algorithm used by synthesizer 606 is adjusted to reduce the computational complexity, thereby increasing the number of time domain samples generated per unit time. For example, controller 614 can increase the value of e described above. Alternatively, controller 614 could force all of the high-frequency components from bands having frequencies above some predetermined frequency to be zero. In this case, controller 614 also instructs de-quantizer 604 not to unpack the high-frequency components that are not going to be used in the synthesis of the signal. This provides additional computational savings. Finally, controller 614 could change the windowing algorithm, i.e., use a truncated prototype filter.*

*If the number of stored values exceeds a second predetermined value, controller 614 adjusts the computational algorithm to regain audio quality if synthesizer 606 is not currently running in a manner that provides the highest audio quality. In this case, controller 614 reverses the approximations introduced into synthesizer 606 discussed above.*

*While audio decompression system 600 has been discussed in terms of individual computational elements, it will be apparent to those skilled in the art that the functions of decoder 602, de-quantizer 604, synthesizer 606, buffer 608 and controller 614 can be implemented on a general purpose digital computer. In this case, the functions provided by clock 609 may be provided by the computer's clock circuitry.*

Figure 13:
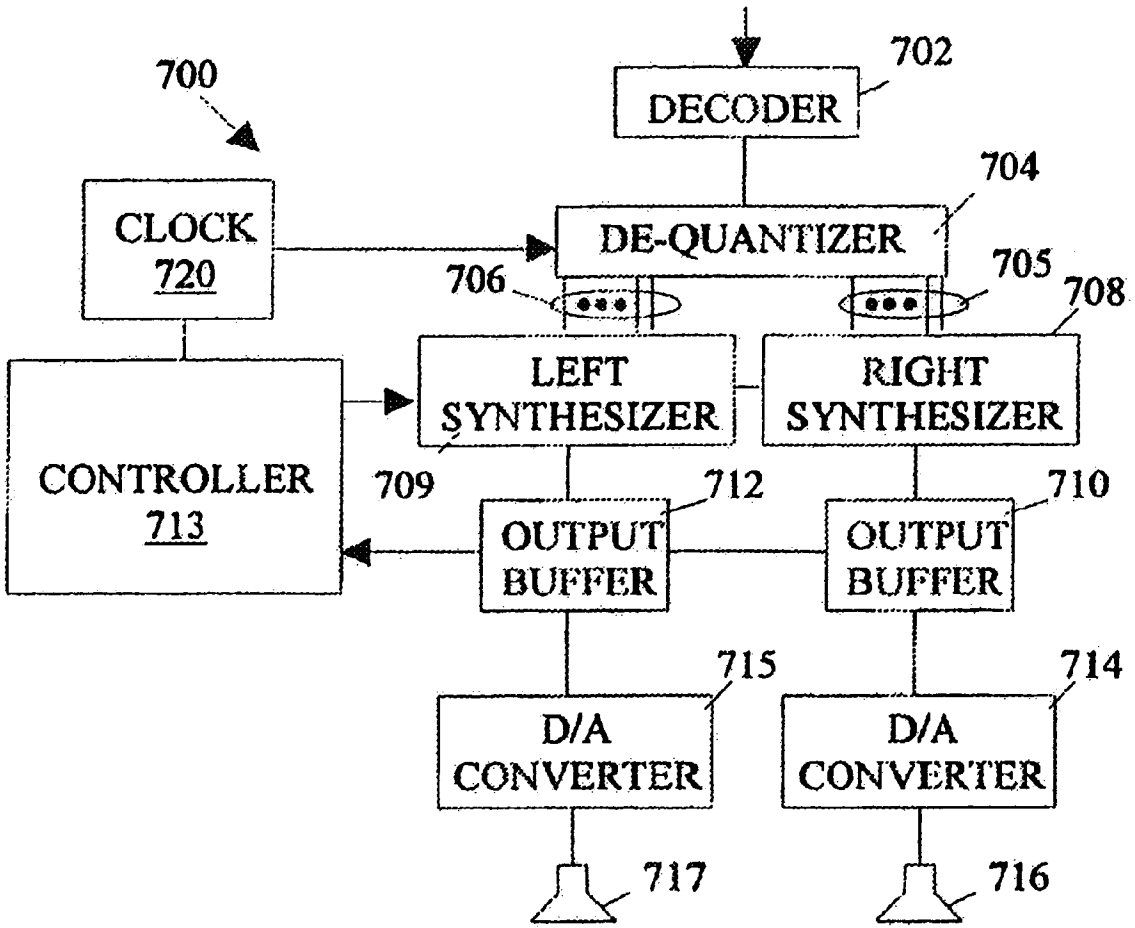
*FIG. 13 is a block diagram of a stereophonic decompression system according to the present invention.*

*In stereophonic decompression systems having parallel computational capacity, two synthesizers may be utilized. A stereophonic decompression system according to the present invention is shown in FIG. 13 at 700. The incoming compressed audio signal is decoded by a decoder 702 and de-quantized by de-quantizer 704 which generates two sets of frequency components 705 and 706. Set 705 is used to regenerate the time domain signal for the left channel with the aid of synthesizer 708, and set 706 is used to generate the time domain signal for the right channel with the aid of synthesizer 709. The outputs of the synthesizers are stored in buffers 710 and 712 which feed time domain audio samples at regular intervals to D/A converters 714 and 715, respectively. The timing of the signal feed is determined by clock 720. The operation of decompression system 700 is controlled by a controller 713 which operates in a manner analogous to controller 614 described above.*

*If a stereophonic decompression system does not have parallel computational capacity, then the regeneration of the left and right audio channels must be carried out by time-sharing a single synthesizer. When the computational workload exceeds the capacity of the decompression system, the trade-offs discussed above may be utilized to trade audio quality for a reduction in the computational workload. In addition, the computational workload may be reduced by switching to a monaural reproduction mode, thereby reducing the computational workload imposed by the synthesis operations by a factor of two.*

Figure 14:
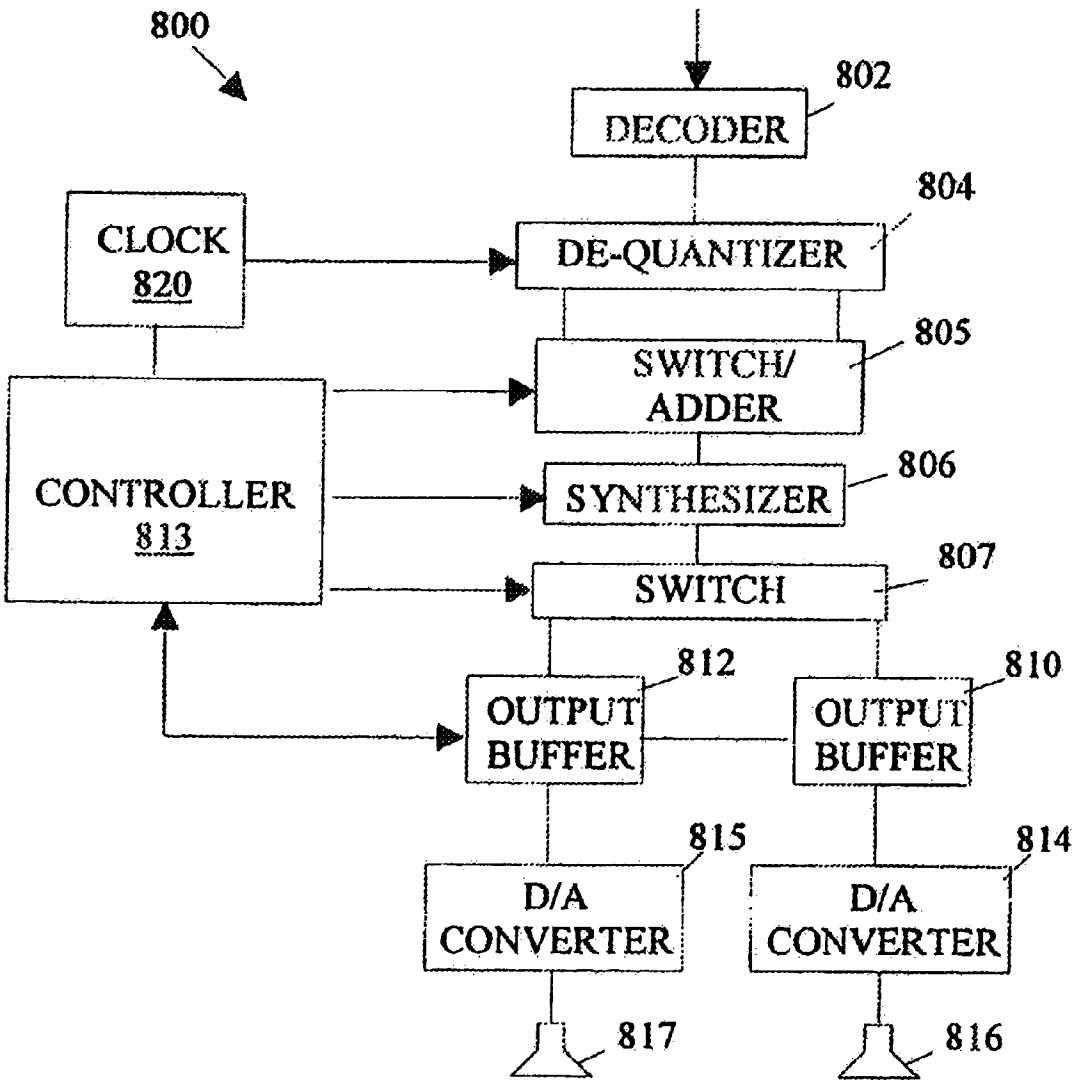
*FIG. 14 is a block diagram of a stereophonic decompression system according to the present invention using a serial computation system.*

*A stereophonic decompression system using this type of serial computation system is shown in FIG. 14 at 800. The incoming compressed audio signal is decoded by a decoder 802 and de-quantized by de-quantizer 804 which generates sets of frequency components for use in synthesizing the left and right audio signals. When there is sufficient computational capacity available to synthesize both left and right channels, controller 813 time shares synthesizer 806 with the aid of switches 805 and 806. When there is insufficient computational capacity, controller 813 causes switch 805 to construct a single set of frequency components by averaging the corresponding frequency components in the left and right channels. The resulting set of frequency components is then used to synthesize a single set of monaural time domain samples which is stored in buffers 810 and 812.*

*The techniques described above for varying the computational complexity required to synthesize a signal may also be applied to vary the computational complexity required to analyze a signal. This is particularly important in situations in which the audio signal must be compressed in real time prior to being distributed through a communication link having a capacity which is less than that needed to transmit the uncompressed audio signal. If a computational platform having sufficient capacity to compress the audio signal at full audio quality is available, the methods discussed above can be utilized.*

*However, there are situations in which the computational capacity of the compression platform may be limited. This can occur when the computational platform has insufficient computing power, or in cases in which the platform performing the compression may also include a general purpose computer that is time-sharing its capacity among a plurality of tasks. In the later case, the ability to trade-off computational workload against audio quality is particularly important.*

Figure 15:
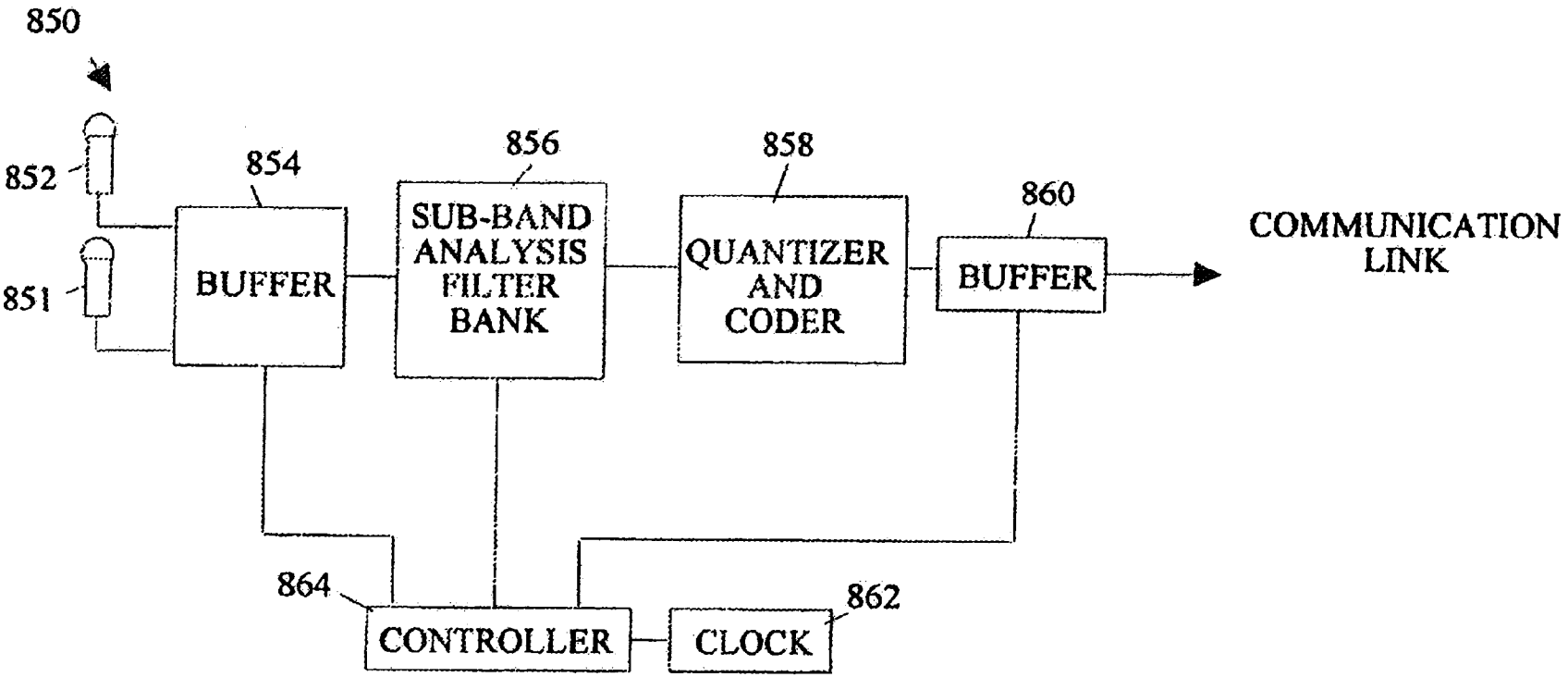
*FIG. 15 is a block diagram of an audio compression apparatus utilizing variable computational complexity.*
Figure 16:
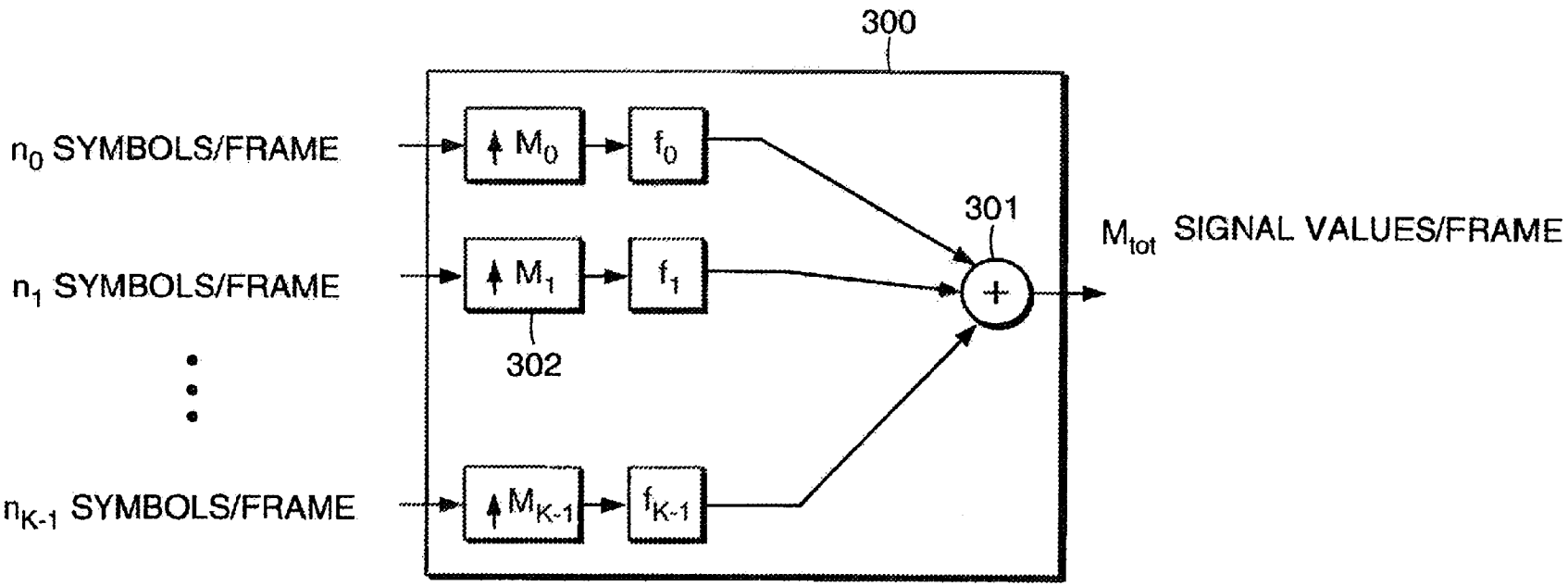

*A block diagram of an audio compression apparatus 850 utilizing variable computational complexity is shown in FIG. 15 at 850. Compression apparatus 850 must provide a compressed signal to a communication link. For the purposes of this discussion, it will be assumed that the communication link requires a predetermined amount of data for regenerating the audio signal at the other end of the communication link. Incoming audio signal values from an*

*audio source such as microphone 852 are digitized and stored in buffer 854. In the case of stereophonic systems, a second audio stream is provided by microphone 851. To simplify the following discussion, it will be assumed that apparatus 850 is operating in a monaural mode unless otherwise indicated. In this case, only one of the microphones provides signal values.*

*When M such signal values have been received, sub-band analysis filter bank 856 generates M signal components from these samples while the next M audio samples are being received. The signal components are then quantized and coded by quantizer 858 and stored in an output buffer 860. The compressed audio signal data is then transmitted to the communication link at a regular rate that is determined by clock 862 and controller 864.*

*Consider the case in which sub-band analysis filter 856 utilizes a computational platform that is shared with other applications running on the platform. When the computational capacity is restricted, sub-band analysis filter bank 856 will not be able to process incoming signal values at the same rate at which said signal values are received. As a result, the number of signal values stored in buffer 854 will increase. Controller 864 periodically senses the number of values stored in buffer 854. If the number of values exceeds a predetermined number, controller 864 alters the operations of sub-band analysis filter bank 856 in a manner that decreases the computational workload of the analysis process. The audio signal synthesized from the resulting compressed audio signal will be of lesser quality than the original audio signal; however, compression apparatus 850 will be able to keep up with the incoming data rate. When controller 864 senses that the number of samples in buffer 854 returns to a safe operating level, it alters the operation of sub-band analysis filter bank 856 in such a manner that the computational workload and audio quality increases.*

*Many of the techniques described above may be used to vary the computational workload of the sub-band analysis filter. First, the prototype filter may be replaced by a shorter filter or a truncated filter thereby reducing the computational workload of the windowing operation. Second, the higher frequency signal components can be replaced by zero's. This has the effect of reducing "M" and thereby reducing the computational workload.*

*Third, in stereophonic systems, the audio signals from each of the microphones 851 and 852 can be combined by circuitry in buffer 854 to form a monaural signal which is analyzed. The compressed monaural signal is then used for both the left and right channel signals.*

*However,* for the purposes of the present discussion, it is sufficient to note that the filters may be implemented as finite impulse response filters with real filter coefficients. If the synthesis filter generates M coefficients per frame representing the amplitude of the transmitted signal, the filter bank accepts M frequency-domain symbols and generates M time-domain coefficients. However, it should be noted that the M coefficients generated may also depend on symbols received prior to the M frequency-domain symbols of the current frame. Similarly, the analysis filter bank demodulates M frequency-domain symbols from M time-domain received signal values in a given frame, and the resulting M symbols may depend on previous frames of M time-domain signal values processed by the filter bank.

The communication bandwidth may alternatively be broken up into sub-bands of distinct (nonuniform) bandwidths by means of a single nonuniform filter bank transform. The synthesis filter bank, or frequency-domain-to-time-domain transform for converting symbols into signal values for transmission, is depicted in FIG. [4] *16* at 300 for a system having K subchannels. If the subchannels are nonuniform in their bandwidth, distinct subchannels of the filter bank will operate at different upsampling rates, the upsampling rate of the $k^{th}$ subchannel will be denoted by $M_k$. The upsampling rates are subject to the critical sampling condition $$\sum_{k=0}^{K-1} \frac{1}{M_k} = 1 \qquad [(1)] \ (7)$$

Referring to FIG. [4] *16*, synthesis filter bank 300 generates $M_{tot}$ time-domain samples in each time frame. Here, $M_{tot}$ is the least common multiple of the upsampling rates $M_k$ provided by the upsamplers of which 302 is typical. Define the integers $n_k$ by $$n_k = \frac{M_{tot}}{K_k}. \qquad [(2)] \ (8)$$

In each frame of transform processing, $n_k$ symbols, denoted by $s_{k,i}$, are mapped onto the $k^{th}$ subchannel using the sequence, $f_k$, as the modulating waveform to generate a time domain sequence, $x_k$, representing the symbols in the $k^{th}$ subchannel, i.e., $$x_k[n] = \sum_i s_{k,i} f_k[n - iM_k] \qquad [(3)] \ (9)$$

Note that symbols from previous frames may contribute to the output of a given frame. Each of the contributions $x_k$ from the K distinct subchannels are added together, as shown at 301, to produce a set of $M_{tot}$ time-domain signal values x[n] from $M_{tot}$ input symbols $S_{k,i}$ during the given frame. The $k^{th}$ subchannel will have a bandwidth that is $1/M_k$ as large as that occupied by the full transmitted signal.

Figure 17:
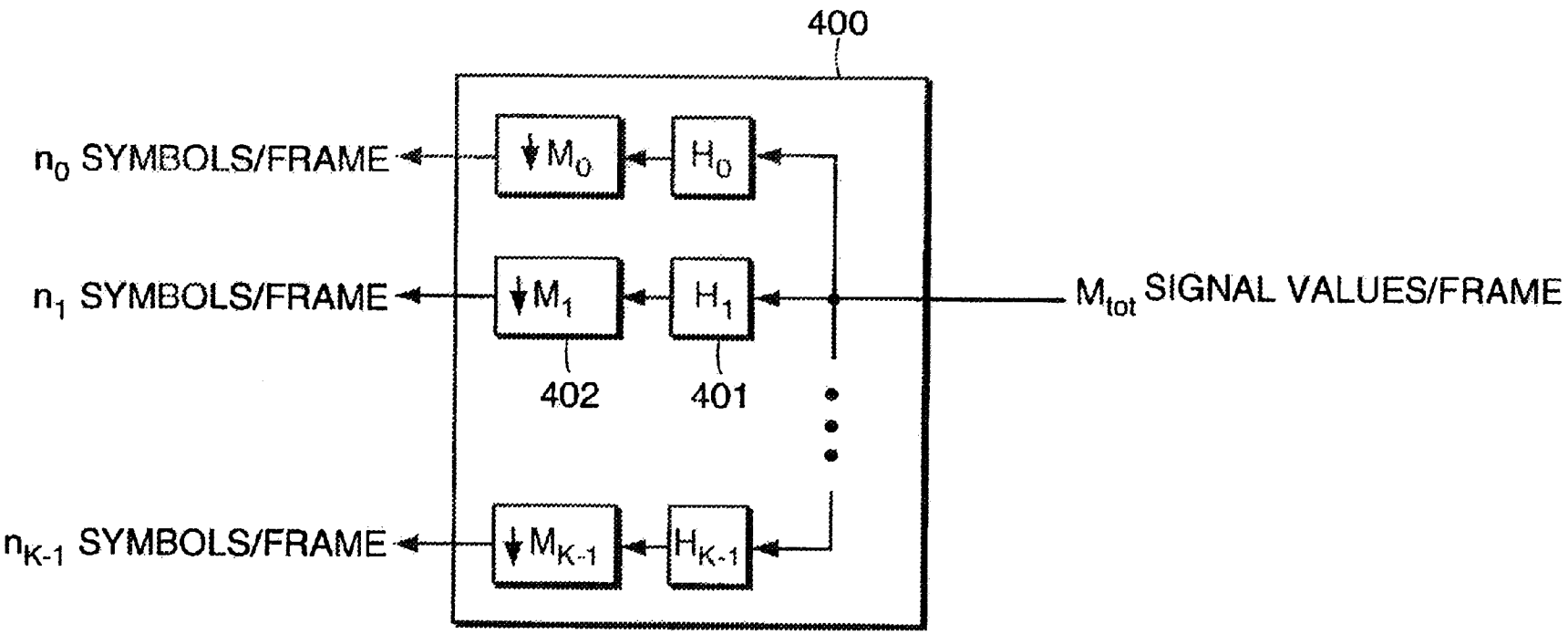

At the receiver, the incoming discrete signal values x'[n] are passed through an analysis filter bank 400, depicted in FIG. 17. The received signal values are denoted by x' to emphasize that the samples have been altered by the transmission link. Each filter in this bank has a characteristic downsampling ratio $M_k$ imposed after filtering by an finite impulse response filter, producing a set of $M_{tot}$ output symbols s per frame. A typical filter is shown at 401 with its corresponding downsampler at 402. The output symbol stream for the $k^{th}$ subchannel is given by $$s'_{k,n} = \sum_i x'[i - nM_k] * H_k[i] \qquad [(4)] \ (10)$$

Again, input signal values from preceding frames may contribute to the set of symbols output during a given frame.

We require that in an ideal channel, the subchannel waveforms, $f_k$, together with the receive filters $H_k$ satisfy perfect-reconstruction or near-perfect-reconstruction conditions, with an output symbol stream that is identical (except for a possible delay of an integer number of samples) to the input symbol stream. This is equivalent to the absence of inter-symbol and inter-channel interference upon reconstruction. Methods for the design of such finite-impulse-response filter bank waveforms are known to the art. The reader is referred to J. Li, T. Q. Nguyen, S. Tantaratana, "A simple design method for nonuniform multirate filter banks," in Proc. Asilomar Conf. On Signals, Systems, and Computers, November 1994 for a detailed discussion of such filter banks.

Various modifications to the present invention will become apparent to those skilled in the art from the foregoing description and accompanying drawings. Accordingly, the present invention is to be limited solely by the scope of the following claims.

What is claimed is:

1. A communication system for sending a sequence of symbols on a communication link a sequence of symbols having values representative of said symbols, said communication system comprising a transmitter for placing information indicative of said sequence of symbols on said communication link and a receiver for receiving said information placed on said communication link by said transmitter, said transmitter comprising a clock for defining successive frames, each said frame comprising M time intervals, where M is an integer greater than 1;

a modulator modulating each of M carrier signals with a signal related to the value of one of said symbols thereby generating a modulated carrier signal corresponding to each of said carrier signals that is to be modulated and generating a sum signal comprising a sum of said modulated carrier signals, said modulator comprising a tree-structured array of filter banks having nodes, including a root node and M leaf nodes, each of said values related to said symbols forming an input to a corresponding one of said leaf nodes, each of said nodes, other than said leaf nodes, comprising one of said filter banks; and an output circuit for transmitting said sum signal on said communication link, wherein said carrier signals comprise first and second carriers, said first carrier having a different bandwidth than said second carrier.

2. The communication system of claim 1 wherein said receiver comprises:

an input circuit for receiving and storing M time-domain samples transmitted on said communication link; and a decoder for recovering said M symbol values, said decoder comprising a tree-structured array of sub-band filter banks, said received M time-domain samples forming the input of a root node of said tree-structured array of said decoder and said M symbol values being generated by the leaf nodes of said tree-structured array of said decoder, each said sub-band filter bank comprising a plurality of FIR filters having a common input for receiving an input time-domain signal, each said filter generating an output signal representing a symbol value in a corresponding frequency band.

3. A communication system for sending a sequence of symbols on a communication link, said communication system comprising a transmitter for placing information indicative of said sequence of symbols on said communication link, said transmitter comprising:

a clock for defining successive frames, each said frame comprising M time intervals, where M is an integer greater than 1;

a modulator modulating each of M carrier signals with a signal related to the value of one of said symbols thereby generating a modulated carrier signal corresponding to each of said carrier signals that is to be modulated and generating a sum signal comprising a sum of said modulated carrier signals;

an output circuit transmitting said sum signal on said communication link, wherein said carrier signals comprise first and second carriers, said first carrier having a different bandwidth than said second carrier; and a receiver comprising:

an input circuit for receiving and storing M time-domain samples transmitted on said communication link; and a decoder for recovering said M symbol values, said decoder comprising a tree-structured array of sub-band filter banks, said received M time-domain samples forming the input of a root node of said tree-structured array said [decorder] *decoder* and said M symbol values being generated by the leaf nodes of said tree-structured array [decorder] *decoder*, each said sub-band filter bank comprising a plurality of FIR filters having a common input for receiving an input time-domain signal, each said filter generating an output signal representing a symbol value in a corresponding frequency band.

4. The communication system of claim 3 wherein said modulator comprises a tree-structured array of filter banks having nodes, including a root node and M leaf nodes, each of said values related to said symbols forming an input to a corresponding one of said leaf nodes, each of said nodes, other than said leaf nodes, comprising one of said filter banks.

*5. A signal processing method comprising:*

*splitting a signal into subbands using a plurality of filter banks connected to form a tree-structured array having a root node and greater than two leaf nodes, each node comprising one filter bank having greater than two filters, and at least one of the leaf nodes having a number of filters that differs from the number of filters in a second leaf node.*

*6. The method of claim 5, wherein at least one of the filter banks is designed to utilize cosine modulation.*

*7. The method of claim 5, wherein the tree-structured array is designed to split a sum of modulated carrier signals.*

*8. The method of claim 7, wherein the tree-structured array is designed to split the sum of modulated carrier signals by transforming the sum of modulated carrier signals into frequency domain symbols, wherein a first frequency domain symbol occupies a first bandwidth and a second frequency domain symbol occupies a second, different bandwidth.*

*9. The method of claim 5, wherein the signal is an audio signal.*

*10. The method of claim 5, wherein at least one of the filter banks is designed to utilize polyphase components.*

*11. The method of claim 10, wherein the polyphase components are generated using a window comprising 512 samples.*

*12. A signal processing method comprising:*

*splitting a signal into sub-bands using a plurality of filter banks connected in a tree-structured array having a first and a second level;*

*the first level comprising one first level filter bank having more than two filters; and*

*the second level comprising at least two second level filter banks, each second level filter bank having as input an output from a different filter in the first level, wherein one second level filter bank has a different number of filters than another second level filter bank.*

*13. The method of claim 12, wherein at least one of the filter banks is designed to utilize cosine modulation.*

*14. The method of claim 12, wherein the signal is a sum of modulated carrier signals.*

*15. The method of claim 12, wherein the signal is an audio signal.*

*16. The method of claim 12, wherein at least one of the filter banks is designed to generate polyphase components.*

*17. The method of claim 16, wherein the polyphase components are generated using a window comprising 512 samples.*

*18. A signal processing method comprising:*

*synthesizing a signal using a plurality of synthesis filter banks connected to form a tree-structured array having greater than two leaf nodes and a root node,*

*wherein each of the nodes comprises one synthesis filter bank having greater than two filters, with at least one of the leaf nodes having a number of filters that differs from the number of filters in a second leaf node.*

*19. The method of claim 18, wherein at least one of the synthesis filter banks is designed to utilize polyphase components.*

*20. The method of claim 19, wherein the polyphase components are generated using a window length of 512 samples.*

*21. The method of claim 18, wherein at least one of the synthesis filter banks is designed to transform frequency components into polyphase components by cosine modulating the frequency components.*

*22. The method of claim 18, wherein the signal is a regenerated time-domain audio signal.*

*23. The method of claim 18, wherein the signal is a sequence of symbols to be transmitted over a communication link.*

*24. The method of claim 18, wherein the tree-structured array is designed to synthesize a decompressed audio signal.*

*25. The method of claim 18, wherein at least one of the synthesis filter banks is designed to transform sub-band components into polyphase components by cosine modulating the sub-band components.*

*26. A signal processing method comprising:*

*synthesizing a signal using a plurality of synthesis filter banks connected in a tree-structured array having a first and a second level,*

*wherein the first level comprises more than two first level synthesis filter banks, and one first level synthesis filter bank has a different number of filters than another first level synthesis filter bank, and*

*the second level comprises one synthesis filter bank having more than two filters, the second level having as inputs the outputs of the first level synthesis filter banks.*

*27. The method of claim 26, wherein at least one of the synthesis filter banks is designed to utilize polyphase components.*

*28. The method of claim 27, wherein the polyphase components are generated using a window length of 512 samples.*

*29. The method of claim 26, wherein at least one of the synthesis filter banks is designed to transform frequency components into polyphase components by cosine modulating the frequency components.*

*30. The method of claim 26, wherein the signal is a reconstructed audio signal.*

*31. The method of claim 26, wherein the signal is a sequence of symbols to be transmitted over a communication link.*

*32. The method of claim 26, wherein the tree-structured array is designed to synthesize a decompressed audio signal.*

*33. The method of claim 26, wherein at least one of the synthesis filter banks is designed to transform sub-band components into polyphase components by cosine modulating the sub-band components.*

*34. A signal processing system comprising:*

*a plurality of filter banks that can connect to form a tree-structured array to split a signal into subbands, the tree-structured array having a root node and greater than two leaf nodes, each node comprising one filter bank having greater than two filters, and at least one of the leaf nodes having a number of filters that differs from the number of filters in a second leaf node.*

*35. The system of claim 34, wherein at least one of the filter banks is designed to utilize cosine modulation.*

*36. The system of claim 34, wherein the signal is a sum of modulated carrier signals.*

*37. The system of claim 36, wherein the tree-structured array is designed to split the sum of modulated carrier signals by transforming the sum of modulated carrier signals into frequency domain symbols, wherein a first frequency domain symbol occupies a first bandwidth and a second frequency domain symbol occupies a second, different bandwidth.*

*38. The system of claim 34, wherein the signal is an audio signal.*

*39. The system of claim 34, wherein at least one of the filter banks is designed to utilize polyphase components.*

*40. The system of claim 39, wherein the polyphase components are generated using a window comprising 512 samples.*

*41. A signal processing system comprising:*

*a plurality of filter banks designed that can connect to form a tree-structured array to split a signal into subbands, the tree-structured array having a first and a second level;*

*the first level comprising one first level filter bank having more than two filters; and*

*the second level comprising at least two second level filter banks, each second level filter bank having as input an output from a different filter in the first level, wherein one second level filter bank has a different number of filters than another second level filter bank.*

*42. The system of claim 41, wherein at least one of the filter banks is designed to utilize cosine modulation.*

*43. The system of claim 41, wherein the signal is a sum of modulated carrier signals.*

*44. The system of claim 43, wherein the sum of modulated carrier signals is transformed into frequency domain symbols, wherein a first frequency domain symbol occupies a first bandwidth and a second frequency domain symbol occupies a second, different bandwidth.*

*45. The system of claim 41, wherein the signal is an audio signal.*

*46. The system of claim 41, wherein at least one of the filter banks is designed to generate polyphase components.*

*47. The system of claim 46, wherein the polyphase components are generated using a window comprising 512 samples.*

*48. A signal processing system comprising:*

*a plurality of synthesis filter banks that can connect to form a tree-structured array to synthesize a signal, the tree-structured array having greater than two leaf nodes and a root node,*

*wherein each of the nodes comprises one synthesis filter bank having greater than two filters, with at least one of the leaf nodes having a number of filters that differs from the number of filters in a second leaf node.*

*49. The system of claim 48, wherein at least one of the synthesis filter banks is designed to generate polyphase components.*

*50. The system of claim 48, wherein at least one of the synthesis filter banks is designed to transform frequency components into polyphase components by cosine modulating the frequency components.*

*51. The system of claim 48, wherein the signal is a decompressed audio signal.*

*52. The system of claim 48, wherein the signal is a sequence of symbols to be transmitted over a communication link.*

*53. The system of claim 48, wherein the tree-structured array is designed to synthesize a decompressed audio signal.*

*54. The system of claim 48, further comprising a modulator designed to modulate a first symbol onto a carrier having a first bandwidth, and a second symbol onto a carrier having a second, different bandwidth.*

*55. The system of claim 48, wherein at least one of the synthesis filter banks is designed to transform sub-band components into polyphase components by cosine modulating the sub-band components.*

*56. The system of claim 55, wherein the polyphase components are generated using a window length of 512 samples.*

*57. A signal processing system comprising:*

*a plurality of synthesis filter banks designed that can connect to form a tree-structured array to synthesize a signal, the tree-structured array having a first and a second level,*

*wherein the first level comprises more than two first level synthesis filter banks, and one first level synthesis filter bank has a different number of filters than another first level synthesis filter bank, and*

*the second level comprises one synthesis filter bank having more than two filters, the second level having as inputs the outputs of the first level synthesis filter banks.*

*58. The system of claim 57, wherein at least one of the synthesis filter banks is designed to generate polyphase components.*

*59. The system of claim 58, wherein the polyphase components are generated using a window length of 512 samples.*

*60. The system of claim 57, wherein at least one of the synthesis filter banks is designed to transform frequency components into polyphase components by cosine modulating the frequency components.*

*61. The system of claim 57, wherein the signal is a regenerated time domain audio signal.*

*62. The system of claim 57, wherein the signal is a sequence of symbols to be transmitted over a communications link.*

*63. The system of claim 57, wherein the tree-structured array is designed to synthesize a decompressed audio signal.*

*64. The system of claim 57, further comprising a modulator designed to modulate a first symbol onto a carrier having a first bandwidth, and a second symbol onto a carrier having a second, different bandwidth.*

*65. The system of claim 57, wherein at least one of the synthesis filter banks transforms sub-band components into polyphase components by cosine modulating the sub-band components.*

*66. A signal processing system comprising:*

*means for splitting a signal into subbands using a plurality of filter banks that can connect to form a tree-structured array having a root node and greater than two leaf nodes, each node comprising one filter bank having greater than two filters, and at least one of the leaf nodes having a number of filters that differs from the number of filters in a second leaf node.*

*67. The system of claim 66, wherein at least one of the filter banks is designed to utilize cosine modulation.*

*68. The system of claim 66, wherein the signal is an audio signal.*

*69. The system of claim 66, wherein at least one of the filter banks is designed to generate polyphase components.*

*70. The system of claim 69, wherein the polyphase components are generated using a window comprising 512 samples.*

*71. A signal processing system comprising:*

*means for splitting a signal into sub-bands using a plurality of filter banks that can connect to form a tree-structured array having a first and a second level;*

*the first level comprising one first level filter bank having more than two filters; and*

*the second level comprising at least two second level filter banks, each second level filter bank having as input an output from a different filter in the first level, wherein one second level filter bank has a different number of filters than another second level filter bank.*

*72. The system of claim 71, wherein at least one of the filter banks is designed to utilize cosine modulation.*

*73. The system of claim 71, wherein the signal is an audio signal.*

*74. The system of claim 71, wherein at least one of the filter banks is designed to generate polyphase components.*

*75. The system of claim 74, wherein the polyphase components are generated using a window comprising 512 samples.*

*76. A signal processing system comprising:*

*means for synthesizing a signal using a plurality of synthesis filter banks that can connect to form a tree-structured array having greater than two leaf nodes and a root node,*

*wherein each of the nodes comprises one synthesis filter bank having greater than two filters, with at least one of the leaf nodes having a number of filters that differs from the number of filters in a second leaf node.*

*77. The system of claim 76, wherein at least one of the synthesis filter banks is designed to utilize polyphase components.*

*78. The system of claim 77, wherein the polyphase components are generated using a window length of 512 samples.*

*79. The system of claim 76, wherein at least one of the synthesis filter banks is designed to transform frequency components into polyphase components by cosine modulating the frequency components.*

*80. The system of claim 76, wherein the signal is a reconstructed audio signal.*

*81. The system of claim 76, wherein the tree-structured array is designed to synthesize a decompressed audio signal.*

*82. The system of claim 76, wherein at least one of the synthesis filter banks is designed to transform sub-band components into polyphase components by cosine modulating the sub-band components.*

*83. A signal processing system comprising:*

*means for synthesizing a signal using a plurality of synthesis filter banks that can connect to form a tree-structured array having a first and a second level,*

*wherein the first level comprises more than two first level synthesis filter banks, and one first level synthesis filter bank has a different number of filters than another first level synthesis filter bank, and*

*the second level comprises one synthesis filter bank having more than two filters, the second level having as inputs the outputs of the first level synthesis filter banks.*

*84. The system of claim 83, wherein at least one of the synthesis filter banks is designed to utilize polyphase components.*

*85. The system of claim 84, wherein the polyphase components are generated using a window length of 512 samples.*

*86. The system of claim 83, wherein at least one of the synthesis filter banks is designed to transform frequency components into polyphase components by cosine modulating the frequency components.*

*87. The system of claim 83, wherein the signal is a reconstructed audio signal.*

*88. The system of claim 83, wherein the tree-structured array is designed to synthesize a decompressed audio signal.*

*89. The system of claim 83, wherein at least one of the synthesis filter banks is designed to transform sub-band components into polyphase components by cosine modulating the sub-band components.*

*90. An information storage media having stored thereon information that when executed splits a signal into subbands using a plurality of filter banks connected to form a tree-structured array having a root node and greater than two leaf nodes, each node comprising one filter bank having greater than two filters, and at least one of the leaf nodes having a number of filters that differs from the number of filters in a second leaf node.*

*91. The media of claim 90, wherein at least one of the filter banks is designed to utilize cosine modulation.*

*92. The media of claim 90, wherein the signal is an audio signal.*

*93. The media of claim 90, wherein at least one of the filter banks is designed to utilize polyphase components.*

*94. The media of claim 93, wherein the polyphase components are generated using a window comprising 512 samples.*

*95. An information storage media having stored thereon information that when executed splits a signal into sub-bands using a plurality of filter banks connected in a tree-structured array having a first and a second level;*

*the first level comprising one first level filter bank having more than two filters; and*

*the second level comprising at least two second level filter banks, each second level filter bank having as input an output from a different filter in the first level, wherein one second level filter bank has a different number of filters than another second level filter bank.*

*96. The media of claim 95, wherein at least one of the filter banks is designed to utilize cosine modulation.*

*97. The media of claim 95, wherein the signal is an audio signal.*

*98. The media of claim 95, wherein at least one of the filter banks is designed to generate polyphase components.*

*99. The media of claim 98, wherein the polyphase components are generated using a window comprising 512 samples.*

*100. An information storage media having stored thereon information that when executed synthesizes a signal using a plurality of synthesis filter banks connected to form a tree-structured array having greater than two leaf nodes and a root node,*

*wherein each of the nodes comprises one synthesis filter bank having greater than two filters, with at least one of the leaf nodes having a number of filters that differs from the number of filters in a second leaf node.*

*101. The media of claim 100, wherein at least one of the synthesis filter banks is designed to utilize polyphase components.*

*102. The media of claim 101, wherein the polyphase components are generated using a window length of 512 samples.*

*103. The media of claim 100, wherein at least one of the synthesis filter banks is designed to transform frequency components into polyphase components by cosine modulating the frequency components.*

*104. The media of claim 100, wherein the signal is a reconstructed audio signal.*

*105. The media of claim 100, wherein the tree-structured array is designed to synthesize a decompressed audio signal.*

*106. The media of claim 100, wherein at least one of the synthesis filter banks is designed to transform sub-band components into polyphase components by cosine modulating the sub-band components.*

*107. An information storage media having stored thereon information that when executed synthesizes a signal using a plurality of synthesis filter banks connected in a tree-structured array having a first and a second level,*

*wherein the first level comprises more than two first level synthesis filter banks, and one first level synthesis filter bank has a different number of filters than another first level synthesis filter bank, and*

*the second level comprises one synthesis filter bank having more than two filters, the second level having as inputs the outputs of the first level synthesis filter banks.*

*108. The media of claim 107, wherein at least one of the synthesis filter banks is designed to generate polyphase components.*

*109. The media of claim 108, wherein the polyphase components are generated using a window comprising 512 samples.*

*110. The media of claim 107, wherein at least one of the synthesis filter banks is designed to transform frequency components into polyphase components by cosine modulating the frequency components.*

*111. The media of claim 107, wherein the signal is a decompressed audio signal.*

*112. The media of claim 107, wherein the tree-structured array is designed to synthesize a decompressed audio signal.*

*113. The media of claim 107, wherein at least one of the synthesis filter banks is designed to transform sub-band components into polyphase components by cosine modulating the sub-band components.*

*114. An information storage media having stored thereon audio information having been split into subbands using a plurality of filter banks connected to form a tree-structured array having a root node and greater than two leaf nodes, each node comprising one filter bank having greater than two filters, and at least one of the leaf nodes having a number of filters that differs from the number of filters in a second leaf node.*

*115. The media of claim 114, wherein the information is audio information.*

*116. A information storage media having stored thereon audio information having been split into sub-bands using a plurality of filter bands connected in a tree-structured array having a first and a second level;*

*the first level comprising one first level filter bank having more than two filters; and*

*the second level comprising at least two second level filter banks, each second level filter bank having as input an output from a different filter in the first level, wherein one second level filter bank has a different number of filters than another second level filter bank.*

*117. The media of claim 116, wherein the information is audio information.*

*118. A method of regenerating a signal using a plurality of synthesis filter banks connected to form a tree-structured array having greater than two leaf nodes and a root node,*

*wherein each of the nodes comprises one synthesis filter bank having greater than two filters, with at least one of the leaf nodes having a number of filters that differs from the number of filters in a second lead node.*

*119. The media of claim 118, wherein the regenerated signal is an audio signal.*

*120. A method of reconstructing a signal using a plurality of synthesis filter banks connected in a tree-structured array having a first and a second level,*

*wherein the first level comprises more than two first level synthesis filter banks, and one first level synthesis filter bank has a different number of filters than another first level synthesis filter bank, and*

*the second level comprises one synthesis filter bank having more than two filters, the second level having as inputs the outputs of the first level synthesis filter banks.*

*121. The media of claim 120, wherein the regenerated signal is an audio signal.*

* * * * *

UNITED STATES PATENT AND TRADEMARK OFFICE

CERTIFICATE OF CORRECTION

PATENT NO. : RE40,281 E
APPLICATION NO. : 10/994925
DATED : April 29, 2008
INVENTOR(S) : Michael A. Tzannes et al.

It is certified that error appears in the above-identified patent and that said Letters Patent is hereby corrected as shown below:

On column 1, add the following as the last sentence of the first paragraph beginning at line 17

-- This application is the parent of Continuation Reissue Application No. 11/898,920, filed Sept. 14, 2007, --

Signed and Sealed this
Twenty-eighth Day of June, 2011

David J. Kappos

David J. Kappos
*Director of the United States Patent and Trademark Office*

US00RE40281C1

(12) EX PARTE REEXAMINATION CERTIFICATE (10769th)

United States Patent
Tzannes et al.

(10) Number: US RE40,281 C1
(45) Certificate Issued: Dec. 1, 2015

(54) SIGNAL PROCESSING UTILIZING A TREE-STRUCTURED ARRAY

(75) Inventors: Michael A. Tzannes, Lexington, MA (US); Peter N. Heller, Somerville, MA (US); John P. Stautner, The Woodlands, TX (US); William R. Morrell, Seattle, WA (US); Sriram Jayasimha, Hyderabad (IN)

(73) Assignee: HYBRID AUDIO LLC, Tyler, TX (US)

Reexamination Request:
No. 90/012,364, Jun. 18, 2012

Reexamination Certificate for:

| | |
|---|---|
| Patent No.: | **Re. 40,281** |
| Issued: | **Apr. 29, 2008** |
| Appl. No.: | **10/994,925** |
| Filed: | **Nov. 23, 2004** |

Certificate of Correction issued Jun. 28, 2011

Related U.S. Patent Documents

Reissue of:

| | |
|---|---|
| (64) Patent No.: | **6,252,909** |
| Issued: | **Jun. 26, 2001** |
| Appl. No.: | **08/804,909** |
| Filed: | **Feb. 25, 1997** |

Related U.S. Application Data

(60) Division of application No. 10/603,833, filed on Jun. 26, 2003, now abandoned, which is an application for the reissue of Pat. No. 6,252,909, which is a continuation-in-part of application No. 08/307,331, filed on Sep. 16, 1994, now Pat. No. 5,606,642, which is a division of application No. 07/948,147, filed on Sep. 21, 1992, now Pat. No. 5,408,580.

(51) Int. Cl.
*G10L 19/02* (2013.01)

(52) U.S. Cl.
CPC ..... *G10L 19/0204* (2013.01)

(58) Field of Classification Search
None
See application file for complete search history.

(56) References Cited

To view the complete listing of prior art documents cited during the proceeding for Reexamination Control Number 90/012,364, please refer to the USPTO's public Patent Application Information Retrieval (PAIR) system under the Display References tab.

*Primary Examiner* — Eron J Sorrell

(57) ABSTRACT

Signal processing is performed by splitting a signal into subbands using a plurality of filter banks connected to form a tree-structured array. The filter banks are connected so that the signal is split into subbands of different size. The subbands can be designed to approximate the bands of the human auditory system for audio signal processing applications. Reconstruction of signals using a plurality ofsynthesis filter banks connected to form a tree-structured array is also performed.

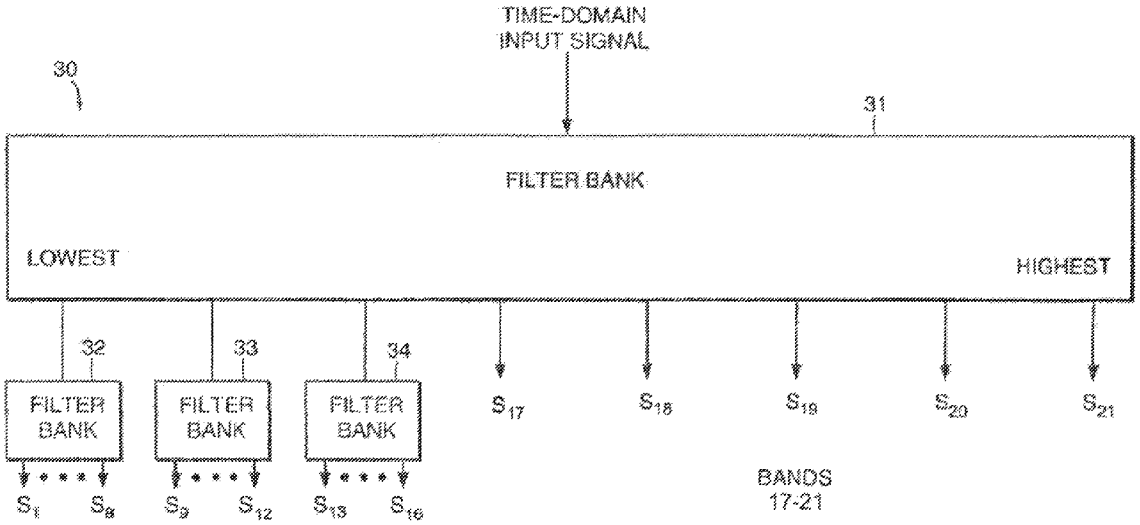

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 5, 6, 9-13, 15-22, 24-30, 32-35, 38-42, 45-51, 53, 55-61, 63 and 65-121 is confirmed.

Claims 1-4, 7, 8, 14, 23, 31, 36, 37, 43, 44, 52, 54, 62 and 64 were not reexamined.

* * * * *